(12) United States Patent
Yamashita et al.

(10) Patent No.: US 11,167,210 B2
(45) Date of Patent: Nov. 9, 2021

(54) STORAGE MEDIUM HAVING STORED THEREIN VIBRATION SIGNAL GENERATION PROGRAM, VIBRATION SIGNAL GENERATION SYSTEM, VIBRATION SIGNAL GENERATION APPARATUS, VIBRATION SIGNAL GENERATION METHOD, AND STORAGE MEDIUM HAVING STORED THEREIN DATA OUTPUT PROGRAM

(71) Applicant: NINTENDO CO., LTD., Kyoto (JP)

(72) Inventors: Kei Yamashita, Kyoto (JP); Shoji Masubuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 647 days.

(21) Appl. No.: 15/084,747

(22) Filed: Mar. 30, 2016

(65) Prior Publication Data

US 2016/0310844 A1    Oct. 27, 2016

(30) Foreign Application Priority Data

Apr. 21, 2015 (JP) .............................. JP2015-086842

(51) Int. Cl.
 H04L 27/02    (2006.01)
 A63F 13/285    (2014.01)
 A63F 13/28    (2014.01)
(52) U.S. Cl.
 CPC ............ *A63F 13/285* (2014.09); *A63F 13/28* (2014.09); *H04L 27/02* (2013.01)
(58) Field of Classification Search
 CPC ......... A63F 13/285; A63F 13/28; H04L 27/02

USPC ......................................................... 463/30
 See application file for complete search history.

(56) References Cited

U.S. PATENT DOCUMENTS

| 4,435,751 | A  | * | 3/1984  | Hori ..................... G10K 11/178 700/280 |
| 5,897,437 | A  | * | 4/1999  | Nishiumi ................ A63F 13/02 463/47 |
| 9,600,083 | B2 | * | 3/2017  | Levesque ................ G06F 3/016 |
| 2006/0046843 | A1 | | 3/2006 | Nakajima |
| 2007/0236449 | A1 | | 10/2007 | Lacroix et al. |

(Continued)

FOREIGN PATENT DOCUMENTS

| JP | 2006-68210 | 3/2006 |
| JP | 2012-230690 | 11/2012 |

(Continued)

OTHER PUBLICATIONS

Office Action in corresponding Japanese Patent Application No. JP2015-086842 dated May 10, 2018.

(Continued)

*Primary Examiner* — Dmitry Suhol
*Assistant Examiner* — Ryan Hsu
(74) *Attorney, Agent, or Firm* — Nixon & Vanderhye P.C.

(57) ABSTRACT

A vibration signal for vibrating a vibration apparatus is generated, and data obtained by encoding amplitude modulation information indicating a change in an amplitude and/or frequency modulation information indicating a change in a frequency are acquired. Then, the acquired data is decoded, and the vibration signal is generated using the decoded amplitude modulation information and/or frequency modulation information.

20 Claims, 10 Drawing Sheets

(56) References Cited

U.S. PATENT DOCUMENTS

| | | | |
|---|---|---|---|
| 2008/0311990 A1* | 12/2008 | Chiu | A63F 13/06 |
| | | | 463/37 |
| 2009/0017911 A1* | 1/2009 | Miyazaki | A63F 13/211 |
| | | | 463/37 |
| 2011/0179868 A1* | 7/2011 | Kaino | G01C 19/5607 |
| | | | 73/504.12 |

FOREIGN PATENT DOCUMENTS

| | | |
|---|---|---|
| JP | 2015-060274 | 3/2015 |
| WO | 01/24158 | 4/2001 |
| WO | 2013/134388 | 9/2013 |

OTHER PUBLICATIONS

Extended European Search Report dated Oct. 5, 2016 issued in corresponding European Application No. 16163513.1 (7 pgs.).

Kara3, Delta encoding, Wikipedia [online], version as of May 27, 2013, searched on Nov. 29, 2019, with corresponding pages in English Wikipedia URL, https://ja.wikipedia.org/w/index.php?title=%E5%B7%AE%E5%88%86%E7%AC%A6%E5%8F%B7%E5%8C%96&oldid=47973432.

Japanese Office Action for Corresponding JP2018-224810, dated Dec. 12, 2019, 3 pages.

* cited by examiner

FIG. 4
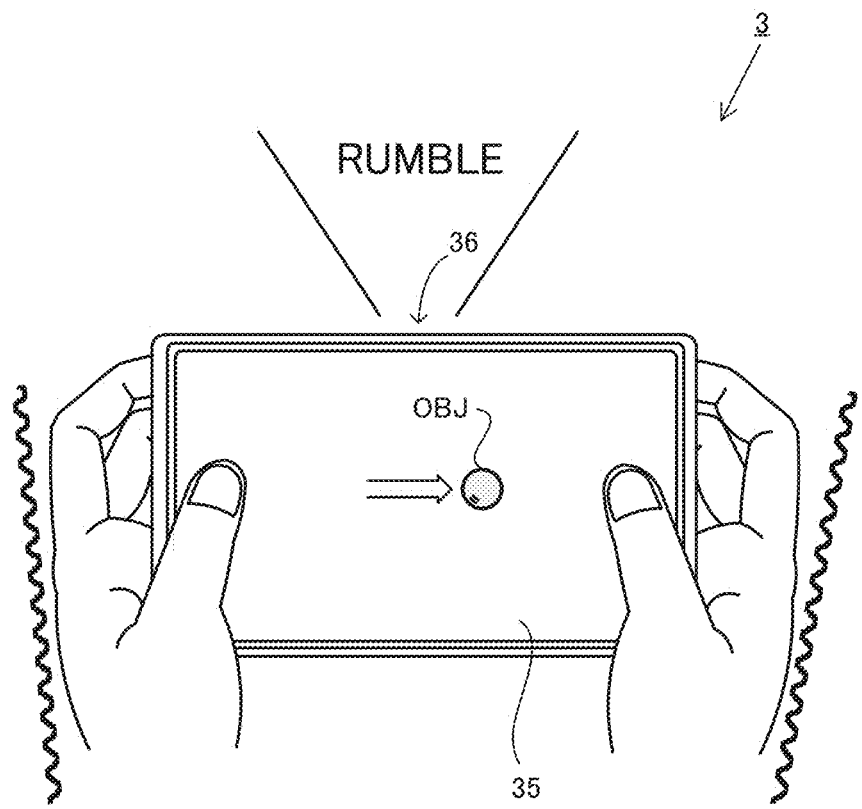
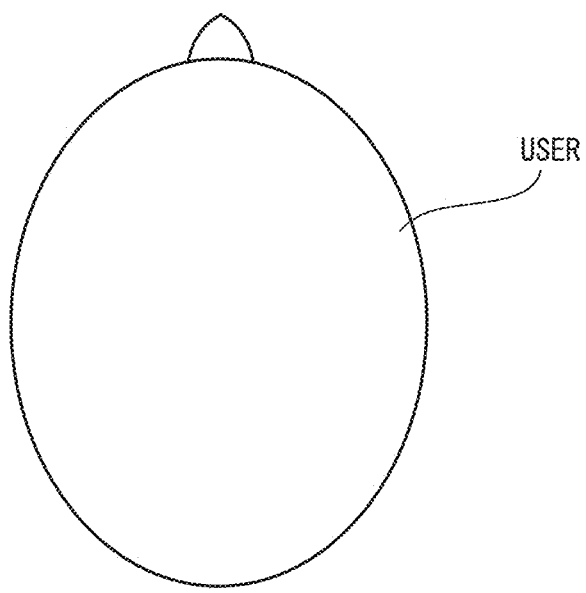

FIG. 7

3-bit AM/FM ENCODING TABLE

| CODE | AMPLITUDE UPDATE COMMAND | FREQUENCY UPDATE COMMAND |
|---|---|---|
| 0(000) | RESET TO INITIAL VALUE | RESET TO INITIAL VALUE |
| 1(001) | MULTIPLY BY $2^{0.5}$(1.414) | MULTIPLY BY $2^{0.2}$(1.149) |
| 2(010) | MULTIPLY BY $2^{0.5}$(1.414) | MULTIPLY BY $2^{-0.2}$(0.871) |
| 3(011) | MULTIPLY BY $2^{-0.3}$(0.812) | MULTIPLY BY $2^{0.2}$(1.149) |
| 4(100) | MULTIPLY BY $2^{-0.3}$(0.812) | MULTIPLY BY $2^{-0.2}$(0.871) |
| 5(101) | MULTIPLY BY $2^{k-2}$ | DO NOTHING |
| 6(110) | MULTIPLY BY $2^{k}$ | DO NOTHING |
| 7(111) | MULTIPLY BY $2^{k+2}$ | DO NOTHING |

FIG. 8 k-CALCULATION TABLE

| AMPLITUDE VALUE A IMMEDIATELY BEFORE UPDATE | VALUE OF k |
|---|---|
| MINIMUM AMPLITUDE $\leq$ A < MINIMUM AMPLITUDE $\times 2^{0.5}$ | 2 |
| MINIMUM AMPLITUDE $\times 2^{0.5} \leq$ A < MINIMUM AMPLITUDE $\times 2^{1.5}$ | 1 |
| MINIMUM AMPLITUDE $\times 2^{1.5} \leq$ A $\leq$ MAXIMUM AMPLITUDE $\times 2^{-1.5}$ | 0 |
| MAXIMUM AMPLITUDE $\times 2^{-1.5}$ < A $\leq$ MAXIMUM AMPLITUDE $\times 2^{-0.5}$ | -1 |
| MAXIMUM AMPLITUDE $\times 2^{-0.5}$ < A $\leq$ MAXIMUM AMPLITUDE | -2 |

STORAGE MEDIUM HAVING STORED THEREIN VIBRATION SIGNAL GENERATION PROGRAM, VIBRATION SIGNAL GENERATION SYSTEM, VIBRATION SIGNAL GENERATION APPARATUS, VIBRATION SIGNAL GENERATION METHOD, AND STORAGE MEDIUM HAVING STORED THEREIN DATA OUTPUT PROGRAM

CROSS REFERENCE TO RELATED APPLICATION

The disclosure of Japanese Patent Application No. 2015-086842, filed on Apr. 21, 2015, is incorporated herein by reference.

FIELD

The technology shown here relates to a storage medium having stored therein a vibration signal generation program, a vibration signal generation system, a vibration signal generation apparatus, a vibration signal generation method, and a storage medium having stored therein a data output program, and in particular, relates to a storage medium having stored therein a vibration signal generation program, a vibration signal generation system, a vibration signal generation apparatus, a vibration signal generation method, and a storage medium having stored therein a data output program that are related to, for example, a vibration to be imparted to a user.

BACKGROUND AND SUMMARY

Conventionally, there is a game apparatus for, in accordance with the magnitude of damage to be inflicted on a certain enemy character, changing the magnitude of a vibration to be imparted to a user.

The game apparatus, however, does not impart the vibration by changing its frequency, its pulse width, or its amplitude. Further, the method for treating data when the frequency, the pulse width, or the amplitude is changed is not disclosed.

Therefore, it is an object of an exemplary embodiment to provide a storage medium having stored therein a vibration signal generation program, a vibration signal generation system, a vibration signal generation apparatus, a vibration signal generation method, and a storage medium having stored therein a data output program that are capable of changing a vibration parameter.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein a vibration signal generation program according to the exemplary embodiment, the vibration signal generation program is executed by a computer included in an apparatus for generating a vibration signal for vibrating a vibration apparatus. The vibration signal generation program causes the computer to execute: acquiring first data obtained by encoding amplitude modulation information indicating a change in an amplitude; decoding the acquired first data; and generating a vibration signal using the decoded amplitude modulation information.

Based on the above, it is possible to generate a vibration signal using first data obtained by encoding amplitude modulation information indicating a change in an amplitude. Thus, it is possible to generate a vibration signal allowing a change in a vibration parameter, and to treat data for changing a vibration parameter.

In addition, in the generation of the vibration signal, the vibration signal may be generated using waveform data indicating a predetermined waveform in which a value greater than a reference value and a value smaller than the reference value are repeated, and the amplitude modulation information.

In addition, in the predetermined waveform, positive and negative values may be repeated.

In addition, in the predetermined waveform, an amplitude may be constant.

In addition, the predetermined waveform may be a sine wave in which an amplitude is constant.

In addition, the predetermined waveform may be a rectangular wave in which an amplitude is constant.

Based on the above, it is possible to generate a vibration signal for easily changing a vibration parameter, using waveform data and amplitude modulation information.

In addition, the predetermined waveform may be a waveform having substantially the same frequency as a resonance frequency of the vibration apparatus.

Based on the above, it is possible to generate a vibration signal allowing the imparting of a relatively strong vibration to a user.

In addition, in the generation of the vibration signal, a current vibration signal may be generated using the decoded amplitude modulation information and an amplitude of the previously generated vibration signal.

Based on the above, it is possible to efficiently generate a vibration signal using amplitude modulation information acquired in a time-series manner.

In addition, in the acquisition of the data, data obtained by encoding amplitude modulation information with respect to each of different frequency ranges may be acquired as the first data. In the decoding, the first data acquired with respect to each frequency range may be decoded. In the generation of the vibration signal, the vibration signal may be generated using the amplitude modulation information decoded with respect to each frequency range.

Based on the above, it is possible to generate a vibration signal based on data encoded with respect to each frequency range. Thus, it is possible to generate a vibration signal allowing a change in a vibration parameter for a plurality of frequency ranges.

In addition, in the generation of the vibration signal, a first vibration waveform may be generated using waveform data indicating a waveform of a first frequency and amplitude modulation information decoded for a first frequency range, a second vibration waveform may be generated using waveform data indicating a waveform of a second frequency and amplitude modulation information decoded for a second frequency range, and the first vibration waveform and the second vibration waveform may be combined together, thereby generating the vibration signal.

Based on the above, a vibration waveform is generated using waveform data and amplitude modulation information with respect to each frequency range, whereby it is possible to generate a vibration signal for easily changing a vibration parameter.

In addition, in the acquisition of the data, data obtained by encoding amplitude modulation information with respect to each frequency range including at least one of frequencies to which a plurality of different human sensory receptors for receiving cutaneous sensation respond may be acquired as the first data.

Based on the above, it is possible to generate a vibration signal enabling a user to efficiently feel a vibration.

In addition, in the acquisition of the data, second data obtained by encoding frequency modulation information indicating a change in a frequency may be further acquired. In the decoding, the acquired second data may be further decoded. In this case, in the generation of the vibration signal, the vibration signal may be generated using the decoded amplitude modulation information and frequency modulation information.

Based on the above, it is possible to generate a vibration signal allowing changes in a frequency and an amplitude.

In addition, in the generation of the vibration signal, a frequency of waveform data indicating a predetermined waveform in which a value greater than a reference value and a value smaller than the reference value are repeated may be changed using the frequency modulation information, and an amplitude of the predetermined waveform may be changed using the amplitude modulation information, thereby generating the vibration signal.

Based on the above, it is possible to generate a vibration signal for easily changing the amplitude and the frequency, using waveform data, frequency modulation information, and amplitude modulation information.

In addition, the predetermined waveform may be a waveform having substantially the same frequency as a resonance frequency of the vibration apparatus.

Based on the above, it is possible to generate a vibration signal allowing the imparting of a relatively strong vibration to a user.

In addition, the vibration signal generation program may further cause the computer to execute vibrating the vibration apparatus using the vibration signal generated in the generation of the vibration signal.

Based on the above, it is possible to generate a vibration signal allowing a change in a vibration parameter while vibrating vibration means.

In addition, in the acquisition of the data, data obtained by encoding the amplitude modulation information may be acquired from another apparatus through wireless communication.

Based on the above, it is possible to transmit a vibration signal through wireless communication.

In addition, the exemplary embodiment may be carried out in the forms of a vibration signal generation apparatus and a vibration signal generation method.

In an exemplary configuration of a vibration signal generation system according to the exemplary embodiment, a vibration signal generation system includes at least a first apparatus and a second apparatus and generates a vibration signal for vibrating a vibration apparatus. The first apparatus includes: a storage device configured to store first data obtained by encoding amplitude modulation information indicating a change in an amplitude in a vibration waveform for vibrating the vibration apparatus; and a computer processor configured to transmit the first data to the second apparatus. The second apparatus includes a computer processor configured to: receive the first data transmitted from the first apparatus; decode the received first data; and generate a vibration signal using the decoded amplitude modulation information.

Based on the above, a first apparatus can transmit first data obtained by encoding amplitude modulation information indicating a change in an amplitude, and a second apparatus can receive the first data to generate a vibration signal. Thus, it is possible to transmit, receive, and generate a vibration signal allowing a change in a vibration parameter. Thus, it is possible to treat data for changing a vibration parameter.

In another exemplary configuration of a non-transitory computer-readable storage medium having stored therein a vibration signal generation program according to the exemplary embodiment, the vibration signal generation program is executed by a computer included in an apparatus for generating a vibration signal for vibrating a vibration apparatus. The vibration signal generation program causes the computer to execute: acquiring data obtained by encoding frequency modulation information indicating a change in a frequency; decoding the acquired data; and generating a vibration signal using the decoded frequency modulation information.

Based on the above, it is possible to generate a vibration signal using data obtained by encoding frequency modulation information indicating a change in a frequency. Thus, it is possible to generate a vibration signal allowing a change in a vibration parameter. Thus, it is possible to treat data for changing a vibration parameter.

In addition, in an exemplary configuration of a non-transitory computer-readable storage medium having stored therein a data output program according to the exemplary embodiment, the data output program is executed by a computer included in an apparatus for outputting data enabling generation of a vibration signal for vibrating a vibration apparatus. The data output program causes the computer to execute: setting amplitude modulation information indicating a change in an amplitude in a vibration waveform for vibrating the vibration apparatus; encoding the amplitude modulation information to generate first data; and outputting the encoded first data.

Based on the above, it is possible to output, to another apparatus, amplitude modulation information allowing the generation of a vibration signal allowing a change in a vibration parameter.

In addition, in the setting of the amplitude modulation information, amplitude modulation information indicating a change in an amplitude with reference to each of different frequency ranges for the vibration waveform may be set with respect to each frequency range. In this case, in the encoding, the amplitude modulation information set with respect to each frequency range may be encoded and generated as the first data. In the output of the data, the first data generated with respect to each frequency range may be output.

Based on the above, it is possible to output data allowing the generation of a vibration signal for changing a vibration parameter for a plurality of frequency ranges.

In addition, in the setting of the amplitude modulation information, the amplitude modulation information indicating the change in the amplitude in the vibration waveform may be set at each predetermined time interval. In the setting of the amplitude modulation information, based on a magnitude of the amplitude indicated with respect to each frequency range, the time interval may be set with respect to each frequency range.

Based on the above, it is possible to output data allowing the generation of a vibration signal that can be accurately generated by giving priority to a vibration having a great influence as sensation to be imparted to a user.

In addition, in the setting of the amplitude modulation information, amplitude modulation information indicating a change in an amplitude with respect to each frequency range including at least one of frequencies to which a plurality of different human sensory receptors for receiving cutaneous sensation respond may be set with respect to each frequency range.

Based on the above, it is possible to output data allowing the generation of a vibration signal enabling a user to efficiently feel a vibration.

In addition, the data output program may further cause the computer to execute setting frequency modulation information indicating a change in a frequency in the vibration waveform. In this case, in the encoding, second data obtained by encoding the frequency modulation information may be further generated. In the output of the data, the encoded first data and the encoded second data may be output.

Based on the above, it is possible to output data allowing the generation of a vibration signal allowing changes in a frequency and an amplitude.

In addition, in the setting of the frequency modulation information, the frequency modulation information may be set by performing predetermined frequency analysis on the vibration waveform.

Based on the above, it is possible to output data allowing the generation of a vibration signal allowing an accurate change in a frequency.

In addition, in the setting of the amplitude modulation information, the amplitude modulation information may be set using a waveform having an envelope of a predetermined value in the vibration waveform.

Based on the above, it is possible to easily generate data allowing the generation of a vibration signal allowing a change in an amplitude.

In addition, in the setting of the amplitude modulation information, amplitude modulation information indicating a change in an amplitude with respect to each of different frequency ranges for the vibration waveform may be set with respect to each frequency range. In the setting of the amplitude modulation information, a bandpass filter process in which a vibration waveform of the frequency range passes through each frequency range may be performed, and then, the amplitude modulation information with respect to each frequency range may be set using a waveform having the envelope.

Based on the above, it is possible to easily generate data allowing the generation of a vibration signal allowing a change in an amplitude with respect to each frequency range.

According to the exemplary embodiment, it is possible to generate a vibration signal using data obtained by encoding amplitude modulation information indicating an change in an amplitude or frequency modulation information indicating a change in a frequency. Thus, it is possible to generate a vibration signal allowing a change in a vibration parameter.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 4 is a diagram showing a non-limiting example where the main body of the information processing apparatus 3 vibrates and simultaneously, a sound is output in accordance with the display position of a virtual object OBJ displayed on a display screen of a display section 35;

FIG. 7 is a diagram showing a non-limiting example of an encoding table used to decode AM/FM code data;

FIG. 8 is a diagram showing a non-limiting example of a k-calculation table used to calculate a value k used in the encoding table;

DETAILED DESCRIPTION OF NON-LIMITING EXAMPLE EMBODIMENTS

With reference to the drawings, a vibration signal generation apparatus for executing a vibration signal generation program according to an exemplary embodiment is described. While the vibration signal generation program according to the exemplary embodiment can be applied by being executed by any computer system, a mobile information processing apparatus 3 (a tablet terminal) is used as an example of the vibration signal generation apparatus, and the vibration signal generation program according to the exemplary embodiment is described using a vibration signal generation program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a mobile game apparatus, or a PDA (Personal Digital Assistant). It should be noted that FIG. 1 is a plan view of an example of the external appearance of the information processing apparatus 3.

Figure 1:
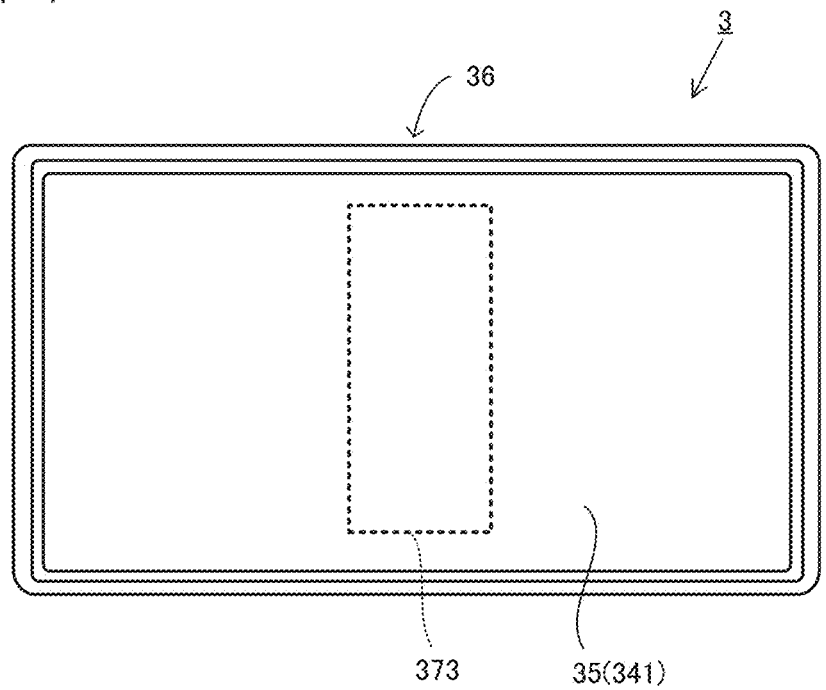
FIG. 1 is a plan view of a non-limiting example of the external appearance of an information processing apparatus 3 according to an exemplary embodiment.

In FIG. 1, the information processing apparatus 3 includes a display section 35, a sound output section 36, and an actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The sound output section 36 includes a loudspeaker for outputting a sound, and in the example shown in FIG. 1, includes a loudspeaker provided on the upper side surface or the back surface of the information processing apparatus 3. The sound output section 36 performs D/A conversion on a sound signal (a sound control signal) output from a control section 31 described later, thereby generating an analog sound signal. Then, the sound output section 36 outputs the analog sound signal to the loudspeaker, thereby outputting a sound.

The actuator 373 is a vibration actuator (a vibrator) for imparting a predetermined vibration to the main body of the information processing apparatus 3 and is included in a vibration generation section 37 described later. In the example shown in FIG. 1, the actuator 373 is provided near the center of the inside of the main body of the information processing apparatus 3. Specifically, as indicated by a dashed line area in FIG. 1, the actuator 373 is provided in a central portion of the display section 35, which is a position between the left hand and the right hand of the user when holding a left end portion of the information processing apparatus 3 in the left hand and holding a right end portion of the information processing apparatus 3 in the right hand. Further, the vibration generation section 37 performs D/A conversion on a vibration control signal output from the control section 31 described later, thereby generating an analog vibration signal. Then, the vibration generation section 37 outputs a driving signal obtained by amplifying the analog vibration signal to the actuator 373, thereby driving the actuator 373.

It should be noted that as is clear from FIG. 1, the display screen of the display section 35 and the sound output section 36, which are provided in the information processing apparatus 3, are placed at positions close to each other. The display screen of the display section 35 and the actuator 373 are placed at positions close to each other. Further, the sound output section 36 and the actuator 373 are placed at positions close to each other, but are different units disposed at different positions. Consequently, it is possible to include a unit dedicated to outputting a vibration and a unit dedicated to outputting a sound. Thus, it is possible to output a vibration and a sound more accurately than when a general-purpose unit is shared. It should be noted that a module into which a unit for outputting a vibration and a unit for outputting a sound are combined and integrated may be provided in the information processing apparatus 3.

Figure 2:
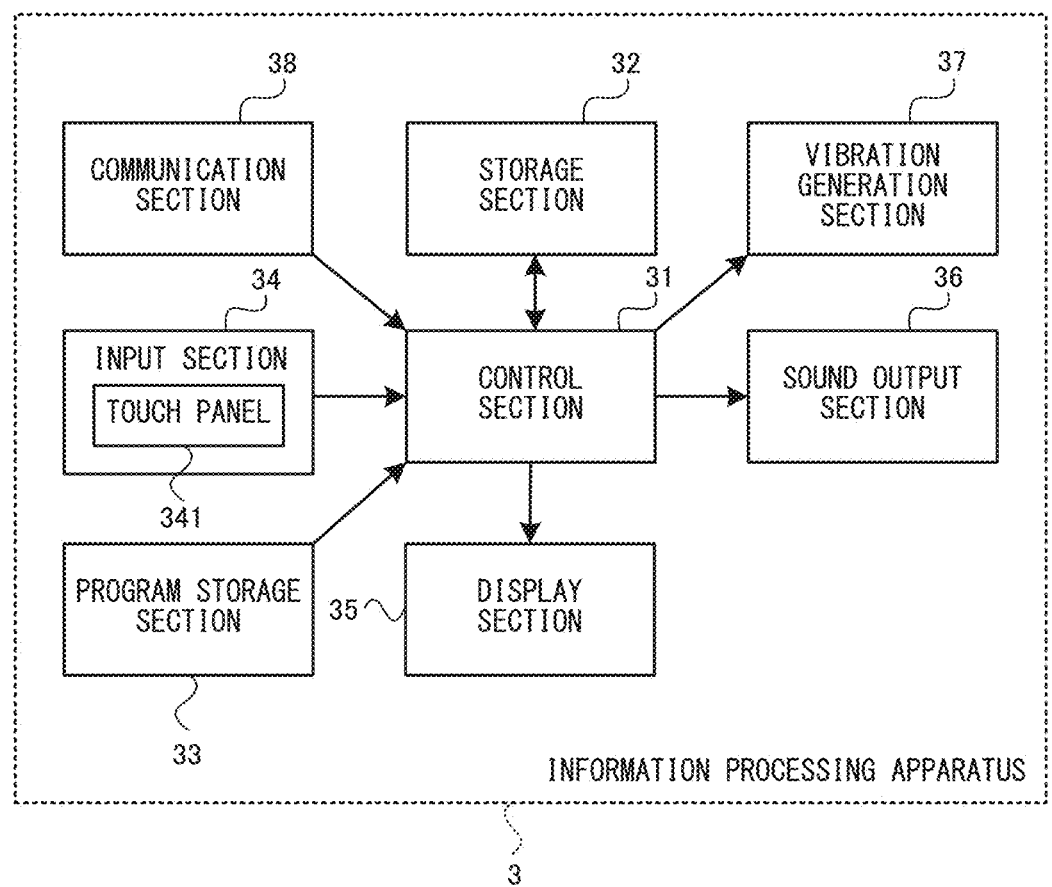
FIG. 2 is a block diagram showing a non-limiting example of the configuration of the information processing apparatus 3.

Next, with reference to FIG. 2, the internal configuration of the information processing apparatus 3 is described. It should be noted that FIG. 2 is a block diagram showing an example of the configuration of the information processing apparatus 3.

In FIG. 2, the information processing apparatus 3 includes the control section 31, a storage section 32, a program storage section 33, and a communication section 38 in addition to the input section 34, the display section 35, the sound output section 36, and the vibration generation section 37, which are described above. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound output section 36, a sound control signal (e.g., a digital sound signal) for controlling a sound to be output from the loudspeaker. Further, as an example of the various types of information processing, the control section 31 receives vibration data transferred from another apparatus via the communication section 38, generates, based on the vibration data, a vibration control signal (e.g., a digital vibration signal) for controlling the vibration to be generated by the actuator 373, and outputs the vibration control signal to the vibration generation section 37.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of a game program or the vibration signal generation program to the storage section 32 at appropriate timing and execute the read program.

The communication section 38 is composed of a predetermined communication module. The communication section 36 transmits and receives data to and from another device via the network, and directly transmits and receives data to and from another information processing apparatus 3. It should be noted that the communication section 38 may transmit and receive data to and from another device by wireless communication, or may transmit and receive data to and from another device by wired communication.

Figure 3:
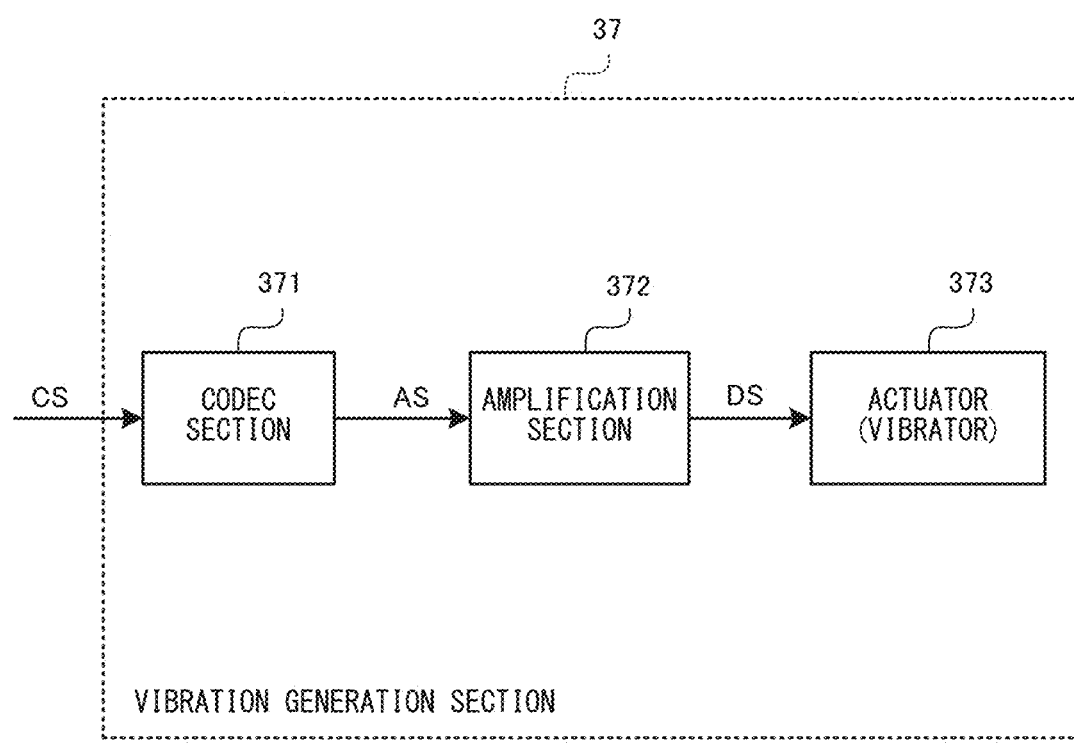
FIG. 3 is a block diagram showing a non-limiting example of the configuration of a vibration generation section 37.

Next, with reference to FIG. 3, the configuration of the vibration generation section 37 is described. It should be noted that FIG. 3 is a block diagram showing an example of the configuration of the vibration generation section 37.

In FIG. 3, the vibration generation section 37 includes a codec section 371, an amplification section 372, the actuator (vibrator) 373.

The codec section 371 acquires a vibration control signal output from the control section 31 and performs a predetermined decoding process on the vibration control signal, thereby generating an analog vibration signal. Then, the codec section 371 outputs the analog vibration signal to the amplification section 372. For example, to generate a vibration in the actuator 373, the control section 31 outputs a vibration control signal (e.g., a vibration control signal CS) for controlling the vibration to be generated. In this case, the codec section 371 decodes the vibration control signal output from the control section 31, thereby generating an analog vibration signal (e.g., an analog vibration signal AS) for generating a vibration in the actuator 373. Then, the codec section 371 outputs the analog vibration signal to the amplification section 372.

The amplification section 372 amplifies the analog vibration signal output from the codec section 371, thereby generating a driving signal for driving the actuator 373. Then, the amplification section 372 outputs the driving signal to the actuator 373. For example, the amplification section 372 increases changes in the amplitudes of the current and/or the voltage of the analog vibration signal (e.g., the analog vibration signal AS) output from the codec section 371, thereby generating a driving signal (e.g., a driving signal DS). Then, the amplification section 372 outputs the driving signal to the actuator 373.

The actuator 373 is driven in accordance with the driving signal output from the amplification section 372, thereby imparting a vibration corresponding to the driving signal to the main body of the information processing apparatus 3. For example, as shown in FIG. 1, the actuator 373 is provided in the center of the display screen of the display section 35. Here, the method of the actuator 373 imparting a vibration to the main body of the information processing apparatus 3 may be any method. For example, the actuator 373 may use the method of generating a vibration by an eccentric motor (ERM: Eccentric Rotating Mass), the method of generating a vibration by a linear vibrator (LRA: Linear Resonant Actuator), the method of generating a vibration by a piezoelectric element, or the like. If the driving signal to be output from the amplification section 372 is generated in accordance with the method of the actuator 373 generating a vibration, an actuator using any method can impart various vibrations to the user of the information processing apparatus 3.

It should be noted that in the above description, an example has been used where a driving signal for driving the actuator 373 is generated by amplifying the analog vibration signal generated by the codec section 371. Alternatively, the signal output from the codec section 371 to the amplification section 372 may be a digital signal. For example, if the actuator 373 is driven by pulse width modulation (PWM) control, the codec section 371 may generate a pulse signal for turning on and off the actuator 373. In this case, the signal output from the codec section 371 to the amplification section 372 is a digital vibration signal for controlling the driving of the actuator 373 using pulse waves. Consequently, the amplification section 372 amplifies the digital vibration signal.

Figure 5:
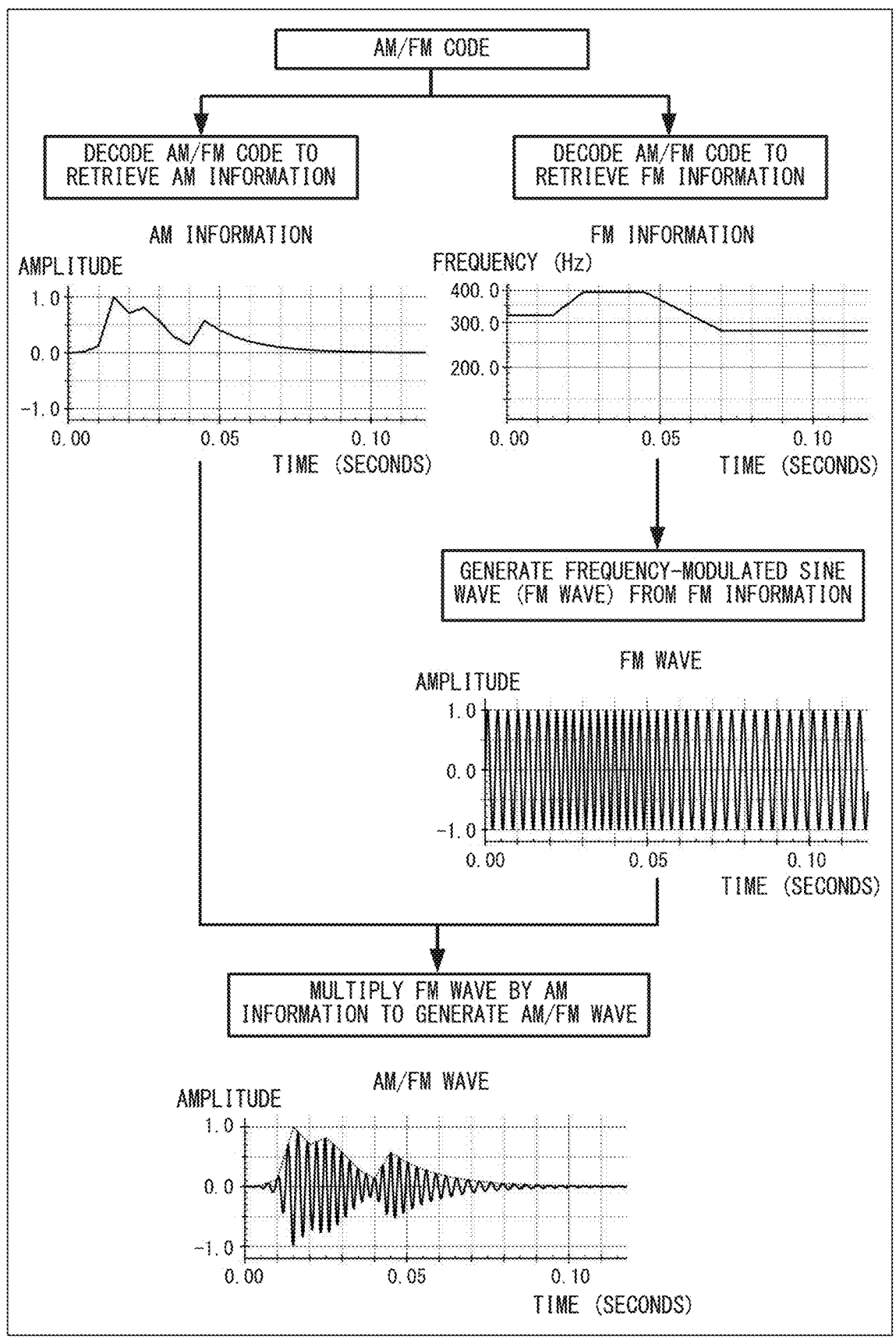
FIG. 5 is a diagram illustrating a non-limiting example of the process of generating a vibration control signal based on acquired vibration data.
Figure 6:
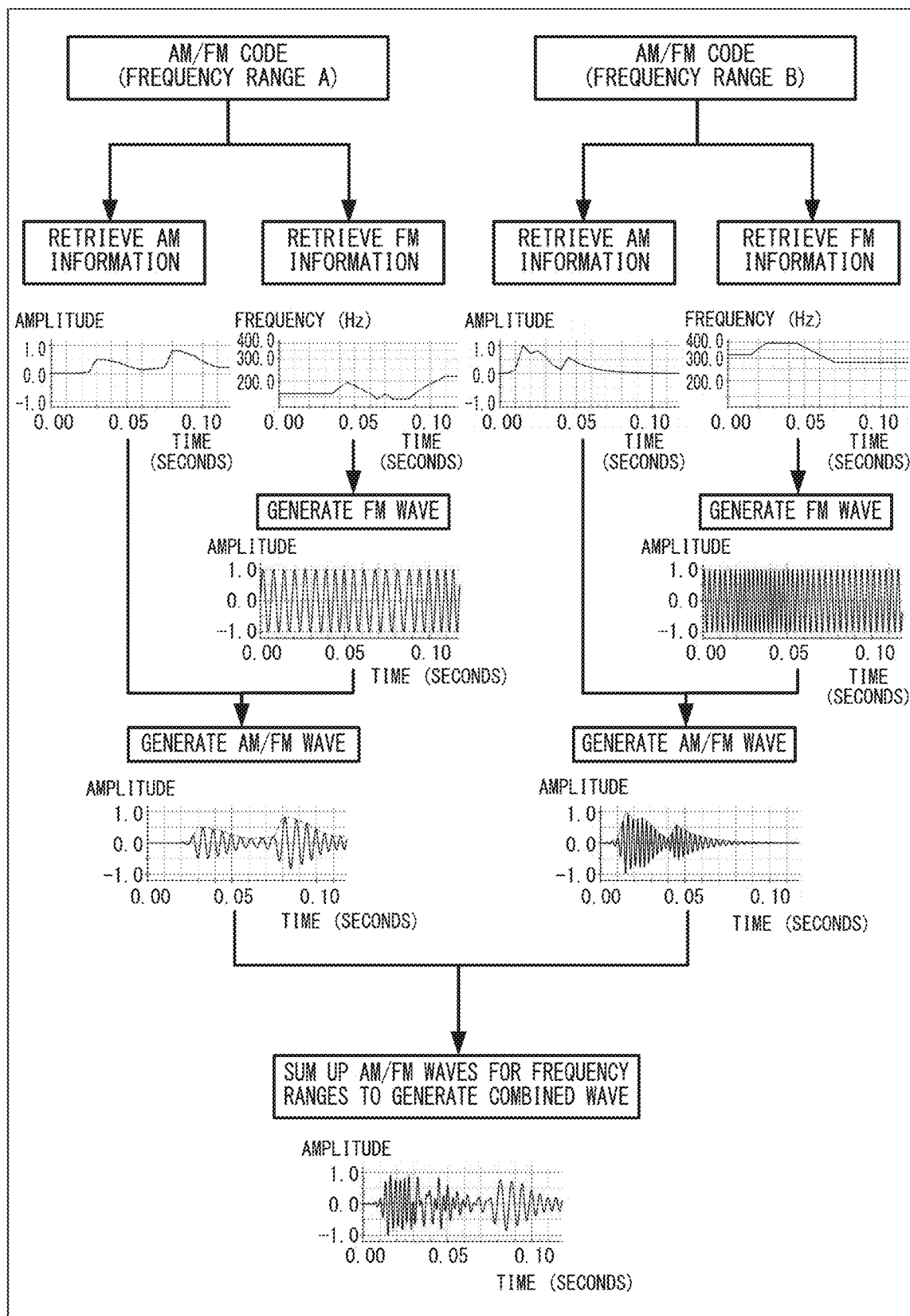
FIG. 6 is a diagram illustrating a non-limiting example of the process of generating a vibration control signal based on vibration data acquired with respect to each frequency range.

Next, with reference to FIGS. 4 to 6, a description is given of an overview of the processing performed by the information processing apparatus 3, before the description of specific processing performed by the information processing apparatus 3. In the following descriptions, the process of performing a game where a virtual object OBJ moves in the display screen of the display section 35 is used as an example of the information processing performed by the information processing apparatus 3. It should be noted that FIG. 4 is a diagram showing an example where the main body of the information processing apparatus 3 vibrates and simultaneously, a sound is output when a virtual object OBJ displayed on the display screen of the display section 35 moves. FIG. 5 is a diagram illustrating an example of the process of generating a vibration control signal based on acquired vibration data. FIG. 6 is a diagram illustrating an example of the process of generating a vibration control signal based on vibration data acquired with respect to each frequency range.

In the example shown in FIG. 4, a virtual object OBJ moving in a virtual space is displayed on the display screen of the display section 35. The virtual object OBJ is displayed on the display screen of the display section 35 so as to move in the virtual space in accordance with a user operation or automatically. Specifically, the virtual object OBJ is a sphere that moves while rolling on a board surface installed in the virtual space.

In accordance with the fact that the virtual object OBJ moves while rolling on the board surface in the virtual space, the information processing apparatus 3 outputs a sound, and simultaneously, the main body of the information processing apparatus 3 vibrates. For example, the loudspeaker (the sound output section 36) provided in the main body of the information processing apparatus 3 outputs a sound such that the virtual object OBJ displayed on the display screen of the display section 35 is the sound source. Further, the actuator 373 provided in the main body of the information processing apparatus 3 generates the vibration to occur when the virtual object OBJ moves while rolling. In the exemplary embodiment, vibration data for generating a vibration control signal for generating this vibration is acquired from another apparatus. Then, based on the acquired vibration data, the information processing apparatus 3 generates a vibration control signal for controlling the driving of the actuator 373.

Next, with reference to FIG. 5, a description is given of an example of the process of generating a vibration control signal. As described above, a vibration control signal for controlling the vibration to be generated by the actuator 373 is generated based on vibration data transferred from another apparatus. In the exemplary embodiment, AM/FM code data transferred from another apparatus is received as vibration data, and an AM/FM wave generated based on the AM/FM code data is used as a vibration control signal. Here, AM code data indicates data representing the amplitude modulation of the vibration, and FM code data indicates data representing the frequency modulation of the vibration. AM/FM code data indicates data representing both the amplitude modulation and the frequency modulation of the vibration. Further, an AM/FM wave indicates a vibration waveform amplitude-modulated and frequency-modulated based on the AM/FM code data.

As shown in FIG. 5, the AM/FM code data is transferred from another apparatus in each constant update cycle of modulating the vibration and functions as the amplitude of the vibration/frequency update command Then, the AM/FM code data is decoded using a predetermined encoding table, thereby retrieving AM information and FM information. Here, the AM information is information indicating the amplitude of the vibration after the update, based on the vibration before the update. Such AM information is analyzed in each update cycle described above, whereby it is possible to acquire information as shown in FIG. 5 for modulating the amplitude of the vibration in a time-series manner based on a predetermined amplitude. Further, the FM information is information indicating the frequency of the vibration after the update, based on the frequency of the vibration before the update. Such FM information is analyzed in each update cycle described above, whereby it is possible to acquire information as shown in FIG. 5 for modulating the frequency of the vibration in a time-series manner based on a predetermined frequency. It should be noted that examples of the decoding process of the AM/FM code data and the encoding table for use in the decoding will be described later.

Next, a frequency-modulated sine wave (an FM wave) is generated from the FM information. Here, the FM wave is a sine wave as shown in FIG. 5 that is displaced with a frequency corresponding to the FM information acquired in each update cycle described above.

Then, the FM wave is multiplied by the AM information, thereby generating an AM/FM wave. Here, the AM/FM wave has a waveform as shown in FIG. 5 that is displaced with a frequency corresponding to the FM information acquired in each update cycle described above, and also with an amplitude corresponding to the AM information acquired in each update cycle described above. A vibration control signal is generated based on the thus generated AM/FM wave, whereby it is possible to vibrate the actuator 373 with a frequency and an amplitude indicated by the AM/FM wave.

Vibration data is transmitted by such an AM/FM transmission method, whereby it is possible to expect the following effects. As a first effect, it is possible to reduce the amount of data communication for transmitting vibration data as compared to a method for transmitting vibration data as it is, a method for transmitting vibration data by lowering the sampling rate of the vibration data, and a method for transmitting vibration data by compressing the vibration data by a predetermined method. As a second effect, the processing load for decoding the transmitted AM/FM code data is relatively low, and therefore, it is possible to perform the decoding process in real time and lead to controlling the vibration of the actuator 373. As a third effect, parameters for controlling the vibration are the frequency and the amplitude, and therefore, it is possible to simplify the work of generating a vibration material. As a fourth effect, the frequency of the vibration controlled by the AM/FM transmission method is set near the resonance frequency of the actuator 373, whereby it is possible to impart a relatively strong (power-efficient) vibration to the user.

In addition, in the above AM/FM transmission method, the AM/FM code data may be transmitted with respect to each frequency range. With reference to FIG. 6, a description is given below of the process of generating a vibration control signal based on vibration data acquired with respect to each frequency range.

As shown in FIG. 6, the AM/FM code data according to the exemplary embodiment is transferred from another apparatus with respect to each frequency range in a constant update cycle of modulating the vibration and functions as a vibration amplitude/frequency update command with respect to each frequency range. For example, in the example shown in FIG. 6, AM/FM code data targeted for a frequency range A, which is a low-frequency range, and AM/FM code data targeted for a frequency range B, which is a high-frequency range, are transmitted from another apparatus in the same update cycle or in different update cycles.

The AM/FM code data targeted for the frequency range A is decoded using the predetermined encoding table similarly to the above process, thereby retrieving AM information and FM information and generating an FM wave from the FM information. Then, the FM wave is multiplied by the AM information targeted for the frequency range A, thereby generating an AM/FM wave targeted for the frequency range A.

Meanwhile, the AM/FM code data targeted for the frequency range B is also decoded using the predetermined encoding table similarly to the above process, thereby retrieving AM information and FM information and generating an FM wave from the FM information. Then, the FM wave is multiplied by the AM information targeted for the frequency range B, thereby generating an AM/FM wave targeted for the frequency range B.

Then, the AM/FM wave targeted for the frequency range A and the AM/FM wave targeted for the frequency range B are summed up, thereby generating a combined wave. The combined wave has both the AM/FM information targeted for the frequency range A and the AM/FM information targeted for the frequency range B and therefore has a waveform as shown in FIG. 6 that is displaced based on information of the frequency and information of the amplitude for a plurality of frequency ranges. A vibration control signal is generated based on the thus generated combined wave, whereby it is possible to vibrate the actuator 373 with a frequency and an amplitude indicated by the combined wave.

Vibration data is transmitted by the AM/FM transmission method with respect to each of such a plurality of frequency ranges, whereby it is possible to transfer a change in the frequency and a change in the amplitude with respect to each of the plurality of frequency ranges. Thus, it is possible to transmit the vibration from another apparatus more accurately. Thus, it is possible to transmit vibration data without causing the deterioration of vibrating sensation to be imparted to the user as compared to another transmission method.

Next, a description is given of an example of the division of a frequency range when the AM/FM code data is transferred with respect to each of a plurality of frequency ranges. As an example, the plurality of frequency ranges for which the AM/FM code data is transferred can be set in accordance with the characteristics of the tactile sensation of a human being to which the vibration is to be imparted. The human sensory receptors for receiving cutaneous sensation include Merkel discs, Meissner corpuscles, Pacinian corpuscles, Ruffini endings, and the like, each of which responds to a vibration in a particular frequency range. Further, a vibration that a human being can feel is said to be a vibration in the frequency range of 0 to 1000 Hz. Here, among the human sensory receptors, only the Meissner corpuscles and the Pacinian corpuscles can solely generate vibrating sensation. The Meissner corpuscles respond to a low-frequency vibration (e.g., 10 to 200 Hz), and the Pacinian corpuscles respond to a high-frequency vibration (e.g., 70 to 1000 Hz).

Thus, the AM/FM code data can be transferred for each of a low-frequency range (10 to 200 Hz) targeted for the Meissner corpuscles, and a high-frequency range (70 to 1000 Hz) targeted for the Pacinian corpuscles.

Then, a frequency as a reference with respect to each frequency range (hereinafter referred to as a "center frequency") is set so that, for example, the ratio of the center frequency is 1.5 or more, and is also set to fit the frequency characteristics (e.g., near the resonance frequency) of a vibration device (the actuator 373 in the above exemplary embodiment). As described above, a frequency band in which the vibration device is likely to vibrate is mainly used, whereby the amount of sense of the vibration to be felt by the user is large relative to power consumed when the vibration is generated. Thus, it is possible to cause the user to feel the vibration more efficiently. It should be noted that if the vibration device has ideal frequency characteristics (flat characteristics), only the characteristics of the human sensory receptors described above need to be taken into account. Thus, for example, the center frequency may be set near 40 Hz in a low-frequency range, and may be set near 250 Hz in a high-frequency range.

It should be noted that in the above description, an example has been used where a frequency range for which the AM/FM code data is transferred is divided in accordance with the response frequency ranges of the human sensory receptors for receiving cutaneous sensation. Alternatively, the frequency range may be divided based on other characteristics. For example, a frequency range for which the AM/FM code data is transferred may be divided in accordance with the characteristic frequency of an actuator to be vibrated. As an example, if the actuator to be vibrated has a plurality of resonance frequencies, a plurality of frequency ranges may be set to include at least one of the resonance frequencies, and the AM/FM code data may be transferred with respect to each of the frequency ranges.

In addition, the AM/FM code data may be transferred with respect to each of three or more frequency ranges. As an example, if it is necessary to generate vibrations in different frequency ranges in order at extremely short time intervals, and if the number of frequency ranges for which the AM/FM code data is transferred is small, the update cycle may not catch up with the speed of transition of frequencies. Specifically, if vibrations having three frequencies of 50 Hz, 150 Hz, and 450 Hz are to be generated in order at 50-millisecond intervals, the AM/FM code data is transferred with respect to each of three or more frequency ranges, whereby it is possible to generate accurate vibrations. It should be noted that as described above, if a vibration is to be felt only by the tactile sensation of a human being, the number of frequency ranges may be two. If, however, a vibration is to be felt by adding an auditory stimulus to the tactile sensation, it can be effective to perform control such that the number of frequency ranges is three or more. Further, to impart vibrations with a plurality of constant frequencies without changing the frequencies of the vibrations, it is desirable that the ratio between the frequencies (the center frequencies) should be a simple integer ratio. As described above, the ratio between frequencies to be generated is an integer ratio, whereby it is possible to prevent the generation of a "hum" when vibrations with two frequencies are simultaneously generated. Here, a "hum" is the phenomenon that two vibration waves having slightly different vibration frequencies interfere with each other to generate a combined wave of which the amplitude of the vibration slowly and cyclically changes.

In addition, the AM/FM code data may be transferred for a single frequency range. As a first example, if there is no use for the generation of vibrations including a plurality of frequency range components, the AM/FM code data can be transferred only for a single frequency range. As a second example, if the frequency characteristics of the vibration device to be vibrated are extremely biased to a certain frequency range, and if the vibration device that hardly vibrates with a frequency other than the only resonance frequency belonging to the frequency range is to be vibrated, the AM/FM code data can be transferred for the frequency range. As a third example, if priority is given to the data compression efficiency of the transfer of the AM/FM code data, the AM/FM code data can be transferred only for a single frequency range.

Next, with reference to FIGS. 7 and 8, an example of the decoding process of the AM/FM code data is described. It should be noted that FIG. 7 is a diagram showing an example of the encoding table used to decode the AM/FM code data. FIG. 8 is a diagram showing an example of a k-calculation table used to calculate a value k used in the encoding table.

FIG. 7 shows a 3-bit AM/FM encoding table for executing an amplitude update command and a frequency update command using a 3-bit code. In the decoding process of the AM/FM code data, an amplitude value and a frequency to be set next are set based on an amplitude value and a frequency indicated immediately before the update process, using such an AM/FM encoding table, and combined waveform data is calculated at a predetermined sampling rate (e.g., 8000 Hz). It should be noted that if the sampling rate in the decoding process is increased, the reproduction accuracy of a combined waveform to be calculated is increased. This, however, increases the load of the decoding process. Thus, the sampling rate may be set taking into account the balance between the frequency of update of the AM/FM code data described later and the reproduction accuracy of a required combined waveform, and the like. In the decoding process of the AM/FM code data described below, the initial value of the amplitude of the vibration is 1/4096, the minimum value of the amplitude of the vibration is 1/4096, the maximum value of the amplitude of the vibration is 1, and a zero threshold for determining the amplitude of the vibration as 0 is 1.5/4096. Further, in the decoding process of the AM/FM code data described below, the initial value of the frequency of the vibration is the center frequency set with respect to each frequency range (e.g., near 160 Hz or 320 Hz, which is the resonance frequency of the vibration device), the minimum value of the frequency of the vibration is 100 Hz, and the maximum value of the frequency of the vibration is 1000 Hz.

The amplitude update command and the frequency update command shown in FIG. 7 indicate the amplitude value and the frequency to be set next based on the amplitude value and the frequency indicated immediately before the update process. Then, an apparatus having received the amplitude update command and the frequency update command updates and sets, based on the received amplitude update command and frequency update command, the amplitude value of the vibration and the frequency of the vibration in the period until the amplitude update command and the frequency update command are received next. As a first example, the amplitude value of the vibration and the frequency of the vibration to be set based on the received amplitude update command and frequency update command may be set as values immediately after the reception, and the amplitude value of the vibration and the frequency of the vibration may be immediately updated. As a second example, the amplitude value of the vibration and the frequency of the vibration to be set based on the received amplitude update command and frequency update command may be set as values immediately before the amplitude update command and the frequency update command are received next, and the amplitude value of the vibration and the frequency of the vibration may be updated in a gradually increasing manner and/or in a gradually decreasing manner so as to reach the values in the above period. As a third example, the amplitude value of the vibration and the frequency of the vibration to be set based on the received amplitude update command and frequency update command may be set as values in the middle of the period until the amplitude update command and the frequency update command are received next, and the amplitude value of the vibration and the frequency of the vibration may be updated in a gradually increasing manner and/or in a gradually decreasing manner so as to reach the values at a time in the middle of the above period.

For example, if the AM/FM code data indicates a code 0 (000), the amplitude value of the vibration is reset to the initial value (e.g., 1/4096) and updated, and the frequency of the vibration is reset to the initial value (e.g., 160 or 320) and updated. If the AM/FM code data indicates a code 1 (001), the amplitude value of the vibration is multiplied by $2^{0.5}$ (approximately 1.414) and updated, and the frequency of the vibration is multiplied by $2^{0.2}$ (approximately 1.149) and updated. If the AM/FM code data indicates a code 2 (010), the amplitude value of the vibration is multiplied by $2^{0.5}$ (approximately 1.414) and updated, and the frequency of the vibration is multiplied by $2^{-0.2}$ (approximately 0.871) and updated. If the AM/FM code data indicates a code 3 (011), the amplitude value of the vibration is multiplied by $2^{-0.3}$ (approximately 0.812) and updated, and the frequency of the vibration is multiplied by $2^{-0.2}$ (approximately 1.149) and updated. If the AM/FM code data indicates a code 4 (100), the amplitude value of the vibration is multiplied by $2^{-0.3}$ (approximately 0.812) and updated, and the frequency of the vibration is multiplied by $2^{-0.2}$ (approximately 0.871) and updated. If the AM/FM code data indicates a code 5 (101), the amplitude value of the vibration is multiplied by $2^{k-2}$ and updated, and the frequency of the vibration is constant. If the AM/FM code data indicates a code 6 (110), the amplitude value of the vibration is multiplied by $2^k$ and updated, and the frequency of the vibration is constant. If the AM/FM code data indicates a code 7 (111), the amplitude value of the vibration is multiplied by $2^{k+2}$ and updated, and the frequency of the vibration is constant.

Here, the value k is set in accordance with the amplitude value indicated immediately before the update process. For example, as shown in FIG. 8, the amplitude value indicated immediately before the update is equal to or greater than the minimum amplitude (e.g., 1/4096) and less than $2^{0.5}$ times the minimum amplitude, the value k is set to k=2. If the amplitude value indicated immediately before the update is equal to or greater than $2^{0.5}$ times the minimum amplitude and less than $2^{1.5}$ times (approximately 2.828 times) the minimum amplitude, the value k is set to k=1. If the amplitude value indicated immediately before the update is equal to or greater than $2^{1.5}$ times the minimum amplitude and less than or equal to $2^{-1.5}$ times (approximately 0.354 times) the maximum amplitude (e.g., 1), the value k is set to k=0. If the amplitude value indicated immediately before the update is greater than $2^{-1.5}$ times the maximum amplitude and less than or equal to $2^{-0.5}$ times (approximately 0.707 times) the maximum amplitude, the value k is set to k=−1. Then, if the amplitude value indicated immediately before the update is greater than $2^{-0.5}$ times the maximum amplitude and less than or equal to the maximum amplitude, the value k is set to k=−2.

It should be noted that in the decoding process of the AM/FM code data described above, an example has been used where a 3-bit AM/FM encoding table for executing an amplitude update command and a frequency update command using a 3-bit code is used. Alternatively, the decoding process may be performed by another method. For example, a decoding process using a 4-bit AM/FM encoding table for executing an amplitude update command and a frequency update command using a 4-bit code, or a decoding process using a 2-bit AM encoding table for executing an amplitude update command using a 2-bit code, or a decoding process using a 3-bit AM encoding table for executing an amplitude update command using a 3-bit code, or the like can be used. In the above decoding process using the 4-bit AM/FM encoding table, it is possible to execute 15 types of amplitude update commands and 15 types of frequency update commands Thus, it is possible to control AM information and FM information in more detail than the decoding process using the 3-bit AM/FM encoding table. Further, in each of the decoding process using the 3-bit AM encoding table and the decoding process using the 2-bit AM encoding table, it is possible to execute only an amplitude update command. As an example, the decoding process is performed by modulating the amplitude of a constant and simple sine wave such that the frequency of the vibration is a predetermined frequency (e.g., the center frequency and also a frequency near the substantial resonance frequency of the actuator). Here, there is a tendency that in the sensation of the vibration to be imparted to the user, generally, the amplitude has a great influence, and the frequency has a small influence. Thus, in the decoding process using the 3-bit AM encoding table and the decoding process using the 2-bit AM encoding table, the vibration is controlled based only on the amplitude, whereby it is possible to control an amplitude update command in detail and also reduce the amount of data communication.

It should be noted that a fundamental wave used in the decoding process using the 3-bit AM encoding table or the decoding process using the 2-bit AM encoding table may not need to be a simple sine wave of which the frequency is constant, and may be a fundamental wave having a waveform having a shape in which positive and negative values are repeated, such as a rectangular wave, a triangular wave, or a sawtooth wave, or a fundamental wave having a waveform having another shape in which the amplitude is constant. Alternatively, noise having a particular frequency range component may be the above fundamental wave. For example, the fundamental wave may be formed of white noise passed through a bandpass filter allowing the passage of a particular frequency range component. Further, the AM/FM code data to be transferred in the decoding process using the 3-bit AM encoding table or the decoding process using the 2-bit AM encoding table may include information indicating the frequency, the shape, the noise type, and the like of the fundamental wave, and the decoding process may be performed using the fundamental wave based on this information.

In addition, the fundamental wave may be a waveform having a shape in which positive and negative values are not repeated. For example, the fundamental wave may only need to be a waveform in which a value greater than a reference value and a value smaller than the reference value are repeated. The fundamental wave may be a waveform having a shape in which a positive local maximum and a local minimum equal to or greater than 0 are alternately repeated, or a waveform having a shape in which a local maximum less than or equal to 0 and a negative local minimum are alternately repeated. As an example, the waveform of the fundamental wave may be a waveform in which a local maximum of +1 and a local minimum of 0 represented by $$(1-\cos(2\pi ft))/2$$

are alternately repeated. Here, f is the frequency, and t is time. If an FM wave is generated using such a fundamental wave, a waveform is formed in which a local maximum of +1 and a local minimum of 0 are alternately repeated with the frequency indicated by FM information. Then, if an AM/FM wave is generated based on the FM wave, a waveform is formed in which, with a local maximum being an amplitude value between 0 and +1 indicated by AM information, the local maximum and a local minimum of 0 are alternately repeated with the frequency indicated by the FM wave.

Using a fundamental wave having such a shape, it is possible to expect the following effect. For example, if the actuator 373 is composed of a linear vibration motor, a spring is provided in the linear vibration motor. Then, if a positive voltage is applied to the linear vibration motor, the position of a weight inside the linear vibration motor moves in the direction opposite to that of the force of the spring, and the weight acts in the direction of returning to the previous position by the reaction force of the spring. Thus, the weight returns to the previous position only by changing the applied voltage to 0 without applying a negative voltage. Thus, it is possible to generate a vibration having a sufficient intensity only by applying a positive voltage. Thus, it is possible to obtain an effect in terms of power efficiency when the linear vibration motor is driven.

In addition, if the AM/FM code data is to be acquired with respect to each of a plurality of frequency ranges and subjected to the decoding process, the AM/FM code data may be acquired with a lower frequency of update than in the form in which the AM/FM code data is acquired with respect to a single frequency range, and may be subjected to the decoding process, thereby generating vibration data. For example, if the AM/FM code data is to be acquired from another apparatus in a cycle of 400 Hz in the form in which the AM/FM code data is acquired with respect to a single frequency range and subjected to the decoding process, and is to be subjected to the decoding process, the AM/FM code data may be acquired from another apparatus in a cycle of 200 Hz in the form in which the AM/FM code data is acquired with respect to each of the two frequency ranges and subjected to the decoding process, and may be subjected to the decoding process. Further, if the AM/FM code data is to be acquired with respect to each of a plurality of frequency ranges and subjected to the decoding process, the AM/FM code data may be acquired with frequencies of update different between the frequency ranges and subjected to the decoding process. As an example, the frequency of update for a high-frequency range can be set to be relatively low with respect to the frequency of update for a low-frequency range. As another example, in accordance with the magnitude of the amplitude of the vibration generated in each frequency range, the AM/FM code data can be transferred with frequencies of update different between the frequency ranges and subjected to the decoding process. For example, if the magnitude of the amplitude of the vibration generated in a first frequency range is greater than the magnitude of the amplitude of the vibration generated in a second frequency range, then in the first frequency range, the AM/FM code data can be acquired from another apparatus with a relatively high frequency of update (e.g., in a cycle of 400 Hz) and subjected to the decoding process. In the second frequency range, the AM/FM code data can be acquired from another apparatus with a relatively low frequency of update (e.g., in a cycle of 200 Hz) and subjected to the decoding process. Further, if the magnitude of the amplitude of the vibration generated in the first frequency range is equivalent to the magnitude of the amplitude of the vibration generated in the second frequency range, and both magnitudes are greater than a predetermined threshold, then in both the first frequency range and the second frequency range, the AM/FM code data can be acquired from another apparatus with a relatively high frequency of update (e.g., in a cycle of 400 Hz) and subjected to the decoding process. Further, if the magnitude of the amplitude of the vibration generated in the first frequency range is equivalent to the magnitude of the amplitude of the vibration generated in the second frequency range, and both magnitudes are smaller than a predetermined threshold, then in both the first frequency range and the second frequency range, the AM/FM code data can be acquired from another apparatus with a relatively low frequency of update (e.g., in a cycle of 200 Hz) and subjected to the decoding process.

Next, a description is given of examples of the process of, in an apparatus as the transfer source of AM code data (i.e., code data for which only an amplitude update command is executed), encoding AM code data, and the process of receiving and decoding the AM code data. First, in the transfer source apparatus, original vibration data (a vibration waveform) to be transferred is prepared. Then, if the transfer source apparatus is to transfer AM code data with respect to each of a plurality of frequency ranges in order to transmit the vibration data to another apparatus, the transfer source apparatus passes the vibration data through a bandpass filter with respect to each of the frequency ranges, thereby generating vibration data of each frequency range component. As an example, to transfer AM code data corresponding to a first frequency range of which the center frequency is 160 Hz and AM code data corresponding to a second frequency range of which the center frequency is 320 Hz, the transfer source apparatus processes the original vibration data using a bandpass filter allowing the passage of a first frequency range component, thereby generating vibration data of the first frequency range component. Then, the transfer source apparatus processes the original vibration data using a bandpass filter allowing the passage of a second frequency range component, thereby generating vibration data of the second frequency range component. Then, using the envelope waveform of a vibration waveform indicating the vibration data of the first frequency range component, the transfer source apparatus encodes the general shape of the envelope using a predetermined encoding table, thereby generating AM code data of the first frequency range component. Further, using the envelope waveform of a vibration waveform indicating the vibration data of the second frequency range component, the transfer source apparatus encodes the general shape of the envelope using the above encoding table, thereby generating AM code data of the second frequency range component. Then, the apparatus as the transfer source of AM code data transmits the generated AM code data of the first frequency range component and the generated AM code data of the second frequency range component to another apparatus in each update cycle. It should be noted that the above process of encoding AM code data may be analyzed and prepared in advance in an off-line process by the transfer source apparatus.

On the other hand, an apparatus having received the AM code data with respect to each frequency range retrieves AM information of the first frequency range component using the above encoding table and multiplies the AM information of the first frequency range component by the fundamental wave of the first frequency range component (e.g., a sine wave of 160 Hz), thereby generating an AM wave corresponding to the first frequency range component. Further, the apparatus retrieves AM information of the second frequency range component using the above encoding table and multiplies the AM information of the second frequency range component by the fundamental wave of the second frequency range component (e.g., a sine wave of 320 Hz), thereby generating an AM wave corresponding to the second frequency range component. Then, the apparatus sums up the AM wave corresponding to the first frequency range component and the AM wave corresponding to the second frequency range component to generate a combined wave, thereby generating a vibration control signal for controlling the driving of the actuator based on the combined wave. It should be noted that the above process of decoding the AM code data and controlling the vibration of the actuator may be performed in real time in accordance with the acquisition of the AM code data from the transfer source apparatus.

Figure 9:
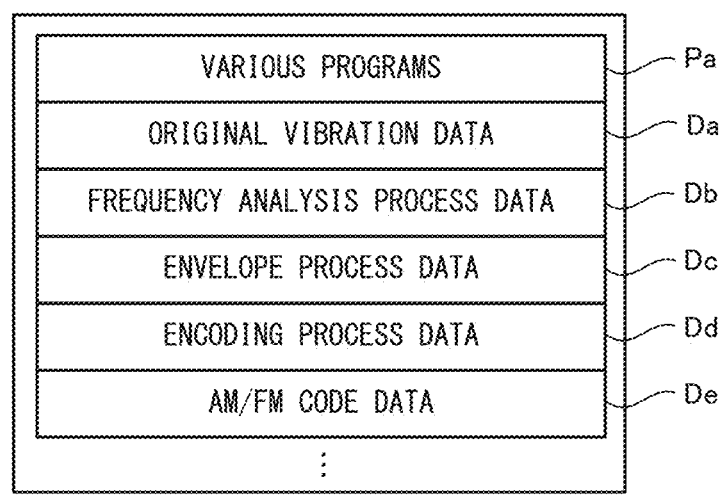
FIG. 9 is a diagram showing non-limiting examples of main data and programs stored in a storage section of a transfer source apparatus when a code data transmission process is performed.

Next, a description is given of the details of a data output process performed by the apparatus as the transfer source of the AM/FM code data (i.e., code data for which an amplitude update command and a frequency update command are executed). It should be noted that in the following description, a code data transmission process is used as an example of the data output process. First, with reference to FIG. 9, main data used in the code data transmission process performed by the transfer source apparatus is described. FIG. 9 is a diagram showing examples of main data and programs stored in a storage section of the transfer source apparatus when the code data transmission process is performed.

As shown in FIG. 9, the following are stored in the data storage area of the storage section of the transfer source apparatus: original vibration data Da; frequency analysis process data Db; envelope process data Dc; encoding process data Dd; AM/FM code data De; and the like. It should be noted that the storage section of the transfer source apparatus may store, as well as the data shown in FIG. 9, data and the like necessary for the processing, such as data used in an application to be executed. Further, in the program storage area of the storage section of the transfer source apparatus, various programs Pa included in a code data transmission program are stored.

The original vibration data Da is original vibration data (a vibration waveform) prepared in advance in the transfer source apparatus and is vibration data as a source for the process of generating AM/FM code data.

The frequency analysis process data Db is data representing a frequency included in vibration data obtained by preforming frequency analysis on original vibration data (a vibration waveform).

The envelope process data Dc is data representing the envelope waveform of a vibration waveform indicating original vibration data or vibration data of a predetermined frequency range component.

The encoding process data Dd is data used when encoding is performed using AM information (the general shape of an envelope) and/or FM information, and is, for example, data including an encoding table data or the like for use in an encoding process.

The AM/FM code data De is data representing AM/FM code data obtained by encoding AM information (the general shape of an envelope) and/or FM information.

Figure 10:
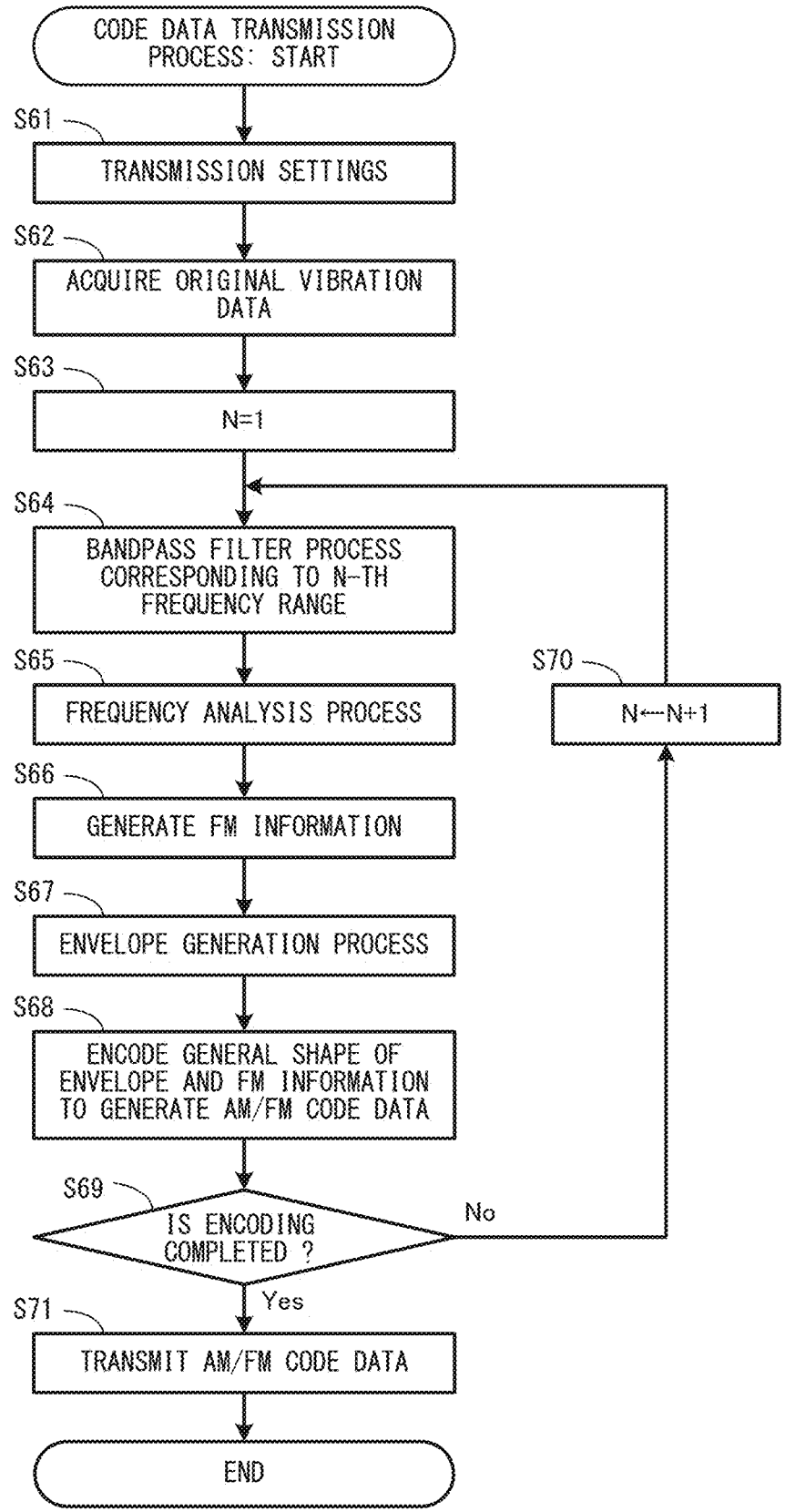
FIG. 10 is a flow chart showing a non-limiting example of the code data transmission process performed by the transfer source apparatus.

Next, with reference to FIG. 10, a detailed description is given of the code data transmission process, which is an example of the data output process performed by the transfer source apparatus. It should be noted that FIG. 10 is a flow chart showing an example of the code data transmission process performed by the transfer source apparatus. Here, in the flow chart shown in FIG. 10, a description is given mainly of, in the processing performed by the transfer source apparatus, the process of generating AM/FM code data based on original vibration data and transmitting the AM/FM code data. The detailed descriptions of other processes not directly related to these processes are omitted. Further, in FIG. 10, all of the steps performed by a control section of the transfer source apparatus are abbreviated as "S".

The CPU of the control section of the transfer source apparatus initializes a memory and the like of the storage section of the transfer source apparatus and loads the code data transmission program from the program storage section 33 into the memory. Then, the CPU starts the execution of the code data transmission program. Further, the CPU of the control section 31 also loads the code data transmission program from the transfer source apparatus into the memory. Then, the CPU starts the execution of the code data transmission program. The flow chart shown in FIG. 10 is a flow chart showing the processing performed after the above processes are completed.

It should be noted that the processes of all of the steps in the flow chart shown in FIG. 10 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section (the CPU) of the transfer source apparatus performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 10, the control section of the transfer source apparatus makes transmission settings (step 61), and the processing proceeds to the next step. For example, the control section of the transfer source apparatus performs initialization for transmitting AM/FM code data to another apparatus (e.g., the information processing apparatus 3). As an example, the control section of the transfer source apparatus sets the number of frequency ranges for which AM/FM code data is to be transmitted, the range of each frequency range, the cycle of transmitting the AM/FM code data, an encoding table for use in encoding, and the like in the encoding process data Dd, thereby initializing each parameter.

Next, the control section of the transfer source apparatus acquires, from the storage section of the transfer source apparatus, original vibration data from which to generate AM/FM code data (step 62), and the processing proceeds to the next step. For example, the control section of the transfer source apparatus extracts, from a plurality of pieces of vibration data stored in advance in the storage section of the transfer source apparatus, vibration data from which to generate AM/FM code data, and stores the extracted vibration data as the original vibration data Da.

Next, the control section of the transfer source apparatus initializes a temporary variable N for use in this process to 1 (step 63), and the processing proceeds to the next step.

Next, the control section of the transfer source apparatus performs a bandpass filter process corresponding to an N-th frequency range (step 64), and the processing proceeds to the next step. For example, the control section of the transfer source apparatus sets a bandpass filter allowing the passage of an N-th frequency range component and processes the vibration data (the vibration waveform) stored as the original vibration data Da, using the bandpass filter, thereby generating vibration data obtained by removing frequency range components other than the N-th frequency range component.

Next, the control section of the transfer source apparatus performs frequency analysis on the vibration data of the N-th frequency range component generated in the above step 64 (step 65), and the processing proceeds to the next step. For example, the control section of the transfer source apparatus performs frequency analysis on the vibration data of the N-th frequency range component to analyze a change in the frequency of the vibration included in the vibration data, and stores data representing the analysis result as the frequency analysis process data Db.

Next, the control section of the transfer source apparatus generates FM information of the N-th frequency range component based on the frequency analysis process data Db corresponding to the N-th frequency range component (step 66), and the processing proceeds to the next step. For example, the control section of the transfer source apparatus generates FM information indicating a change in the frequency of the vibration data of the N-th frequency range component (e.g., the FM information as shown in FIG. 5 or 6) based on the frequency analysis result obtained in the above step 65.

Next, the control section of the transfer source apparatus generates the envelope waveform of the vibration data of the N-th frequency range component generated in the above step 64 (step 67), and the processing proceeds to the next step. For example, the control section of the transfer source apparatus generates a signal having an envelope of the vibration data (the vibration waveform) of the N-th frequency range component generated in the above step 64 and stores data representing the signal as the envelope process data Dc. It should be noted that in the above envelope process, an envelope of a moving maximum value (a maximum value in each certain moving section) of the vibration data of the N-th frequency range component (e.g., waveform data in which the horizontal axis represents time, and the vertical axis represents the amplitude) may be calculated, or an envelope of a section maximum value in each certain section of the vibration data may be calculated, or a curve passing through a local maximum of the amplitude in the vibration data may be calculated.

Next, the control section of the transfer source apparatus encodes the general shape of the envelope waveform generated in the above step 67 and the FM information, thereby generating AM/FM code data (step 68), and the processing proceeds to the next step. For example, based on the general shape of the envelope waveform generated in the above step 67, the control section of the transfer source apparatus calculates the amount of change in the amplitude of the N-th frequency range component with respect to each cycle of transmitting AM/FM code data. Further, based on the FM information generated in the above step 66, the control section of the transfer source apparatus calculates the amount of change in the frequency of the N-th frequency range component with respect to each cycle of transmitting AM/FM code data. Then, based on the encoding table for use in encoding, the control section of the transfer source apparatus encodes the calculated amount of change in the amplitude and the calculated amount of change in the frequency, thereby generating AM/FM code data corresponding to the N-th frequency range component with respect to each cycle of transmitting AM/FM code data. Then, the control section of the transfer source apparatus stores the AM/FM code data as the AM/FM code data De corresponding to the N-th frequency range component.

Next, the control section of the transfer source apparatus determines whether or not the encoding process of the original vibration data acquired in the above step 62 is completed with respect to each frequency range (step 69). Then, if a frequency range with respect to which the encoding process is not completed remains, the processing proceeds to step 70. If, on the other hand, a frequency range with respect to which the encoding process is not completed does not remain, the processing proceeds to step 71.

In step 70, the control section of the transfer source apparatus adds 1 to the temporary variable N to update the temporary variable N, and the processing proceeds to the above step 64.

On the other hand, in step 71, the control section of the transfer source apparatus transmits to the transfer destination apparatus (e.g., the information processing apparatus 3) the AM/FM code data corresponding to each cycle of transmitting AM/FM code data and ends the processing of the flow chart.

It should be noted that the above process of encoding AM/FM code data (i.e., the processes of the above steps 61 to 69) may be performed in advance in an off-line process by the transfer source apparatus and stored as the AM/FM code data De, or may be performed in real time in accordance with a request from the transfer destination apparatus.

Figure 11:
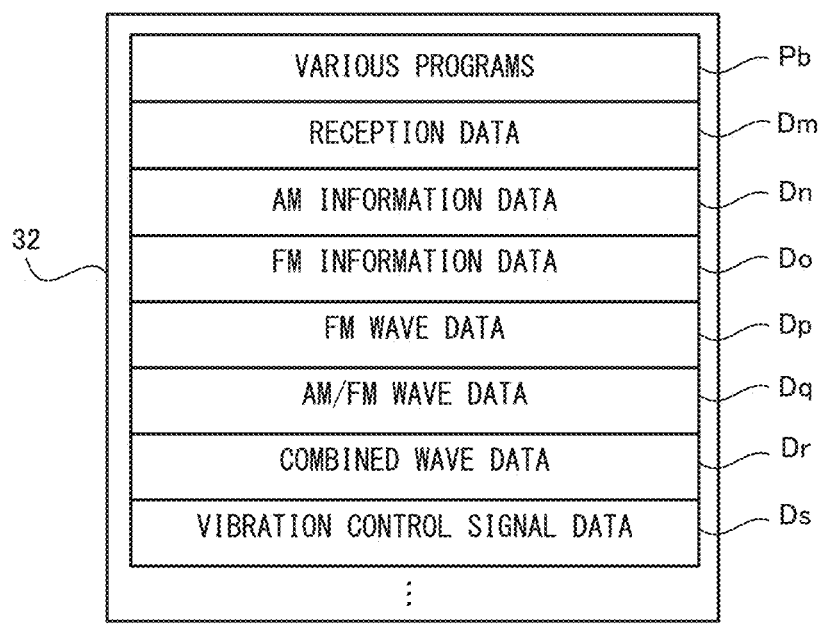
FIG. 11 is a diagram showing non-limiting examples of main data and programs stored in a storage section 32 of the information processing apparatus 3 when a code data reception process is performed.

Next, a description is given of the details of a vibration signal generation process performed by the information processing apparatus 3 as the transfer destination of the AM/FM code data. It should be noted that in the following description, a code data reception process is used as an example of the vibration signal generation process. First, with reference to FIG. 11, main data used in the code data reception process performed by the information processing apparatus 3 is described. FIG. 11 is a diagram showing examples of main data and programs stored in the storage section 32 of the information processing apparatus 3 when the code data reception process is performed.

As shown in FIG. 11, the following are stored in the data storage area of the storage section 32: reception data Dm; AM information data Dn; FM information data Do; FM wave data Dp; AM/FM wave data Dq; combined wave data Dr; vibration control signal data Ds; and the like. It should be noted that the storage section 32 may store, as well as the data shown in FIG. 11, data and the like necessary for the processing, such as data used in an application to be executed. Further, in the program storage area of the storage section 32, various programs Pb included in a code data reception program are stored. For example, the various programs Pb include a reception program for receiving AM/FM code data, a decoding program for decoding AM/FM code data, a vibration control signal generation program for generating a vibration control signal, and the like.

The reception data Dm is data received from another apparatus (e.g., the above transfer source apparatus).

The AM information data Dn is data representing AM information retrieved from AM/FM code data transferred from another apparatus. The FM information data Do is data representing FM information retrieved from AM/FM code data transferred from another apparatus.

The FM wave data Dp is data representing a frequency-modulated sine wave (an FM wave) generated from FM information. The AM/FM wave data Dq is data representing an AM/FM wave generated by multiplying an FM wave by AM information.

The combined wave data Dr is data representing a combined wave generated by summing up AM/FM waves generated for respective frequency ranges. The vibration control signal data Ds is data, generated based on the combined wave, for controlling the driving of the actuator 373. For example, the vibration control signal data Ds is data representing a vibration control signal (the vibration control signal CS; see FIG. 3) to be output from the control section 31 to the vibration generation section 37.

Figure 12:
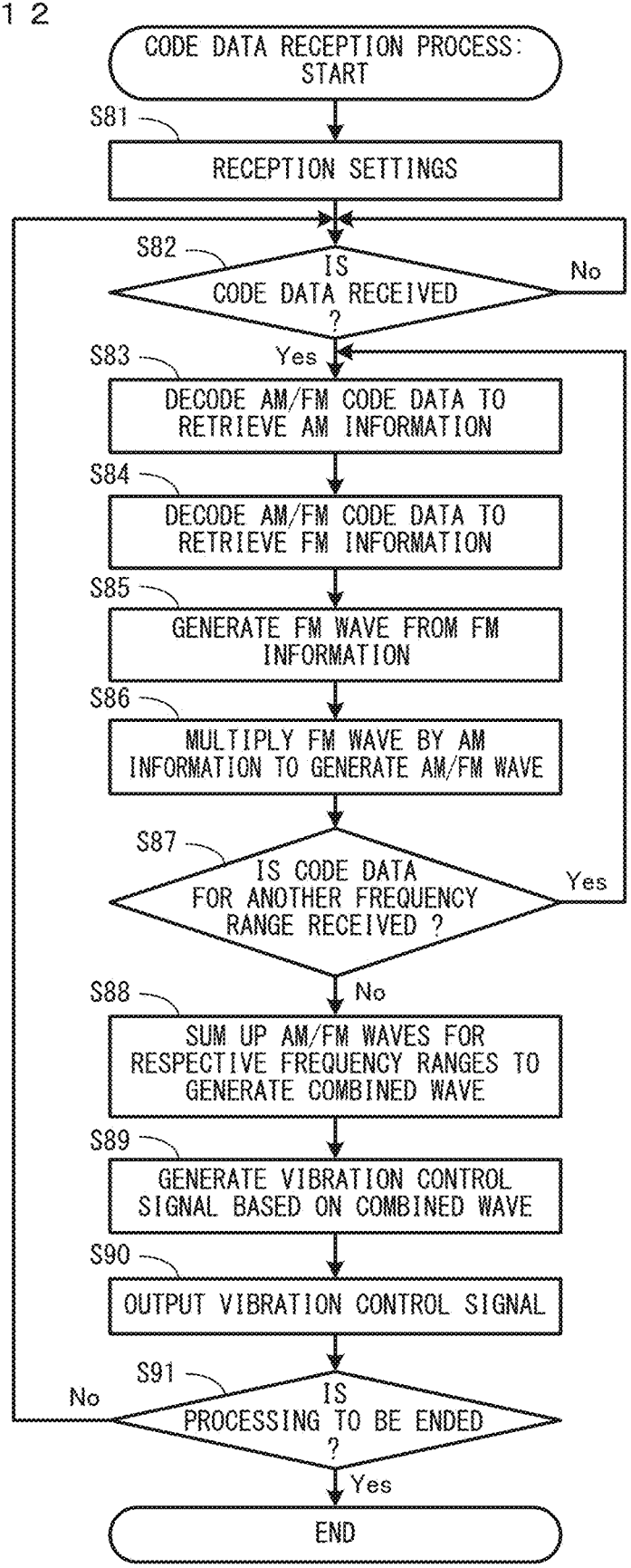
FIG. 12 is a flow chart showing a non-limiting example of the code data reception process performed by the information processing apparatus 3.

Next, with reference to FIG. 12, a detailed description is given of the code data reception process, which is an example of the vibration signal generation process performed by the information processing apparatus 3. It should be noted that FIG. 12 is a flow chart showing an example of the code data reception process performed by the information processing apparatus 3. Here, in the flow chart shown in FIG. 12 a description is given mainly of, in the processing performed by the information processing apparatus 3, the process of receiving AM/FM code data from another apparatus to generate a vibration control signal. The detailed descriptions of other processes not directly related to these processes are omitted. Further, in FIG. 12, all of the steps performed by the control section 31 of the information processing apparatus 3 are abbreviated as "S".

The CPU of the control section 31 of the information processing apparatus 3 initializes a memory and the like of the storage section 32 and loads the code data transmission program from the program storage section 33 of the information processing apparatus 3 into the memory. Then, the CPU starts the execution of the code data reception program. The flow chart shown in FIG. 12 is a flow chart showing the processing performed after the above processes are completed.

It should be noted that the processes of all of the steps in the flow chart shown in FIG. 12 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) of the information processing apparatus 3 performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 12, the control section 31 makes reception settings (step 81), and the processing proceeds to the next step. For example, the control section 31 performs initialization for receiving AM/FM code data from another apparatus (e.g., the above transfer source apparatus). As an example, the control section 31 sets the number of frequency ranges for which AM/FM code data is to be received, the range of each frequency range, the cycle of receiving the AM/FM code data, an encoding table for use in a decoding process, and the like, thereby initializing each parameter. It should be noted that the parameters to be set in the above reception settings may be set based on information described in reception data received from another apparatus.

Next, the control section 31 waits to receive code data (e.g., AM/FM code data) from another apparatus (step 82). Then, if receiving code data from another apparatus, the control section 31 stores the received data as the reception data Dm, and the processing proceeds to step 83.

In step 83, the control section 31 decodes the AM/FM code data received in the above step 82 to retrieve AM information, and the processing proceeds to the next step. For example, the control section 31 sets a frequency range as a processing target, extracts AM/FM code data corresponding to the frequency range from the data received in the above step 82, retrieves AM information of the frequency range component based on the set encoding table, and stores the AM information as the AM information data Dn. Here, the method for retrieving AM information is similar to the form described above with reference to FIGS. 5 to 8. It should be noted that if the amplitude value calculated as the AM information is smaller than the minimum value (e.g., 1/4096) of the amplitude of the vibration set in advance, the AM information is set as the minimum value. Further, if the amplitude value calculated as the AM information is greater than the maximum value (e.g., 1) of the amplitude of the vibration set in advance, the AM information is set as the maximum value.

Next, the control section 31 decodes the AM/FM code data received in the above step 82 to retrieve FM information (step 84), and the processing proceeds to the next step. For example, the control section 31 extracts, from the data received in the above step 82, AM/FM code data corresponding to a frequency range set as a processing target, retrieves FM information of the frequency range component based on the set encoding table, and stores the FM information as the FM information data Do. It should be noted that the method for retrieving FM information is similar to the form described above with reference to FIGS. 5 to 8. It should be noted that if the frequency calculated as the FM information is smaller than the minimum value (e.g., 100 Hz) of the frequency of the vibration set in advance, the FM information is set as the minimum value. Further, if the frequency calculated as the FM information is greater than the maximum value (e.g., 1000 Hz) of the frequency of the vibration set in advance, the FM information is set as the maximum value.

Next, the control section 31 generates a frequency-modulated sine wave (an FM wave) from the FM information retrieved in the above step 84 (step 85), and the processing proceeds to the next step. For example, as described above with reference to FIGS. 5 and 6, the control section 31 generates, as an FM wave corresponding to the above frequency range, a sine wave that is displaced with a frequency corresponding to the FM information. Then, the control section 31 stores data representing the FM wave as the FM wave data Dp.

Next, the control section 31 multiplies the FM wave generated in the above step 85 by the AM information retrieved in the above step 83, thereby generating an AM/FM wave (step 86), and the processing proceeds to the next step. For example, the control section 31 generates, as an AM/FM wave corresponding to the above frequency range, a vibration waveform that is displaced with an amplitude corresponding to the AM information retrieved in the above step 83 and with a frequency corresponding to the FM wave generated in the above step 85. Then, the control section 31 stores data representing the AM/FM wave as the AM/FM wave data Dq. It should be noted that if the amplitude value of the AM/FM wave is to be converted to the value of the amplitude of the vibration for use in an application for generating a vibration, the amplitude value of the AM/FM wave may be changed by a multiplying factor necessary for the conversion in the above step 86. For example, if a vibration sample is represented by a 16-bit integer type with a sign (−32768 to +32767) in the application, the amplitude value of the AM/FM wave is multiplied by 32767 for conversion. If the amplitude value of the AM/FM wave is smaller than the zero threshold (e.g., 1.5/4096), the value of the amplitude of the vibration for use in the application is converted to 0.

Next, the control section 31 determines whether or not code data for another frequency range is received in the above step 82 (step 87). Then, if code data for another frequency range is received, the control section 31 sets a different frequency range as a processing target, and the processing proceeds to the above step 83. If, on the other hand, code data for another frequency range is not received (the decoding process of code data for all the frequency ranges is completed), the control section 31 sets a different frequency range as a processing target, and the processing proceeds to step 83.

In step 88, the control section 31 sums up the AM/FM waves targeted for the respective frequency ranges generated in the above step 86, thereby generating a combined wave, and the processing proceeds to the next step. For example, the control section 31 stores, as the combined wave data Dr, data representing a combined wave generated by summing up the AM/FM waves targeted for the frequency ranges.

Next, based on the combined wave generated in the above step 88, the control section 31 generates a vibration control signal (step 89), and the processing proceeds to the next step. For example, the control section 31 generates the combined wave generated in the above step 88, as it is as a vibration control signal and stores the vibration control signal in the vibration control signal data Ds.

Next, the control section 31 outputs the vibration control signal (step 90), and the processing proceeds to the next step. For example, the control section 31 outputs to the vibration generation section 37 the vibration control signal CS indicated by the vibration control signal data Ds. Consequently, the vibration generation section 37 generates a vibration corresponding to the vibration control signal CS from the actuator 373.

Next, the control section 31 determines whether or not the processing is to be ended (step 91). Examples of conditions for ending the processing include: the satisfaction of the condition under which the processing is ended; and the fact that the user performs the operation of ending the processing. If the processing is not to be ended, the control section 31 returns to the above step 8 and repeats the process thereof. If the processing is to be ended, the control section 31 ends the processing indicated by the flow chart.

As described above, in the processing according to the above exemplary embodiment, a transfer destination apparatus (e.g., the information processing apparatus 3) can generate vibration data using code data transferred from a transfer source apparatus. Here, using code data transferred in each predetermined cycle, the transfer destination apparatus can also change a vibration parameter (e.g., the frequency of the vibration or the amplitude of the vibration) while vibrating an actuator. Thus, it is possible to efficiently treat code data when a vibration parameter is changed during a vibration.

It should be noted that in the above exemplary embodiment, an example has been used where apparatuses transfer code data to and from each other, whereby a transfer destination apparatus generates a vibration signal based on the code data. Alternatively, a vibration signal may be generated in another form. For example, code data generated in each predetermined cycle may be stored in advance in an apparatus for generating a vibration signal (the information processing apparatus 3 in the above example), and if a vibration signal based on the code data is needed, the apparatus may acquire and decode the code data stored in the apparatus itself, thereby generating the vibration signal. This makes it possible to reduce, in an apparatus for generating a vibration signal, the amount of data stored for generating the vibration signal.

In addition, in the above exemplary embodiment, an example is used where a single actuator 373 is provided in the information processing apparatus 3. Alternatively, a plurality of actuators for imparting vibrations to the user may be provided. As an example, a pair of actuators may be provided on the left and right of the information processing apparatus 3. In this case, the control section 31 may generate vibration control signals for driving the respective actuators from a single piece of code data, or may generate vibration control signals for driving the respective actuators from different pieces of code data (e.g., code data for one of the actuators, and code data for the other actuator).

For example, if a plurality of actuators 373 are provided and independent vibrations are generated from the respective actuators 373, the control section 31 outputs a vibration control signal for controlling the vibration of each actuator 373. In this case, the codec section 371 decodes the vibration control signals output from the control section 31, thereby generating analog vibration signals for generating vibrations in the respective actuators 373. Then, the codec section 371 outputs the vibration control signals to the amplification section 372. Then, the amplification section 372 increases changes in the amplitudes of the current and/or the voltage of each of the analog vibration signals output from the codec section 371, thereby generating driving signals. Then, the amplification section 372 outputs the driving signals to the plurality of actuators 373. If a plurality of actuators are included in the information processing apparatus 3, with the use of phantom sensation that stimulates two different points in the user's skin (as an example, the left hand and the right hand of the user holding the main body of the information processing apparatus 3) to cause the user to perceive a pseudo stimulus at one point, the actuators can also impart, to the user of the information processing apparatus 3, vibrations for causing the user to perceive the position of a predetermined image displayed on the display section 35, as the vibration source in a pseudo manner.

In addition, in the above exemplary embodiment, an example has been used where a transfer source apparatus for transferring code data wirelessly transmits the code data to the information processing apparatus 3. Alternatively, the transfer source apparatus may transmit the code data to the information processing apparatus 3 in a wired manner. Even if the transfer speed of communication in a wireless or wired manner is slow, the sending of code data makes it possible to prevent the delay of vibration control.

In addition, an apparatus as the transfer destination of code data may be an operation apparatus (a so-called controller) held and operated by the user. In this case, an actuator for generating a vibration is provided in the operation apparatus, and an apparatus as the transfer source of the code data (e.g., the main body of a game apparatus) transfers the code data for generating vibration data to the operation apparatus (e.g., a controller) by wireless communication. Then, the operation apparatus decodes the code data and controls the driving of the actuator built into the operation apparatus based on the decoded vibration data. As described above, even in a game system including the main body of a game apparatus and a controller wirelessly connected to the main body, the main body of the game apparatus transmits code data to the controller, and the driving of an actuator in the controller is controlled, whereby it is possible to obtain an effect similar to the above. It should be noted that the controller wirelessly connected to the main body of the game apparatus may be a plurality of controllers (e.g., a plurality of controllers held by a plurality of users, or a pair of controllers held by a single user with both hands), and the game system may include the main body of the game apparatus and the plurality of controllers into which actuators are built. In this case, the main body of the game apparatus transfers code data for generating vibration data to each of the plurality of controllers by wireless communication, thereby enabling each controller to generate a vibration corresponding to the code data. It should be noted that the main body of the game apparatus may not perform the process of encoding vibration data, and data obtained by encoding vibration data may be included in advance in a program or the like installed in the main body of the game apparatus. In this case, the main body of the game apparatus outputs code data encoded in advance to the controller, where necessary, and the controller decodes the code data. It should be noted that the communication between the main body of the game apparatus and a single controller or a plurality of controllers may be performed in a wireless or wired manner.

In addition, the above descriptions are given using the example where the transfer source apparatus performs the data output process (e.g., the code data transmission process), and the information processing apparatus 3 performs the vibration signal generation process (the code data reception process). Alternatively, another apparatus may perform at least some of the processing steps in the processing. For example, if the transfer source apparatus and the information processing apparatus 3 are further configured to communicate with another apparatus (e.g., another server, another game apparatus, or another mobile terminal), the other apparatus may cooperate to perform the processing steps of the processing. Another apparatus may thus perform at least some of the processing steps in the processing, thereby enabling processing similar to the above information processing. Further, the above processing can be performed by a processor or the cooperation of a plurality of processors, the processor or the plurality of processors included in an information processing system including at least one information processing apparatus. It should be noted that the information processing system including at least one information processing apparatus can be an information processing system including a plurality of information processing apparatuses (a so-called system including a complex of a plurality of apparatuses), or can be an information processing system including a single information processing apparatus (a so-called system including a single apparatus including a plurality of units). Further, in the above exemplary embodiment, the processing indicated in the above flow chart is performed by the control section of each of the transfer source apparatus and the information processing apparatus 3 executing a predetermined vibration signal generation program. Alternatively, a part or all of the processing indicated in the flow chart may be performed by a dedicated circuit included in each of the transfer source apparatus and the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus, or three or more loudspeakers may output sounds from the information processing apparatus. Alternatively, the information processing apparatus may include a plurality of display sections. Further, in the above description, a mobile apparatus (e.g., a tablet terminal) has been used as an example of the information processing apparatus 3. Alternatively, the information processing apparatus 3 may be a handheld apparatus or a portable apparatus larger than a mobile apparatus. Here, a handheld apparatus is an apparatus that can be operated by the user holding it in their hands, and is a concept including the above mobile apparatus. Further, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus and mobile apparatus.

In addition, the vibration signal generation program may be supplied to the information processing apparatus 3 not only through an external storage medium such as the external memory 45, but also through a wired or wireless communication link. Further, the vibration signal generation program may be stored in advance in a non-volatile storage device included in the information processing apparatus 3. It should be noted that examples of an information storage medium having stored therein the vibration signal generation program may include CD-ROMs, DVDs, optical disk storage media similar to these, flexible disks, hard disks, magneto-optical disks, and magnetic tapes, as well as non-volatile memories. Alternatively, an information storage medium having stored therein the vibration signal generation program may be a volatile memory for storing the vibration signal generation program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a vibration signal generation program, a vibration signal generation system, a vibration signal generation apparatus, a vibration signal generation method, a data output program, and the like in order, for example, to change a vibration parameter.

What is claimed is:

1. A non-transitory computer-readable storage medium having stored therein a vibration signal generation program to be executed by a computer included in an apparatus structured to generate a vibration signal for vibrating a vibration apparatus, the vibration signal generation program comprising instructions causing the computer to execute operations comprising:
    acquiring first data obtained by encoding amplitude modulation information indicating a changing amplitude;
    decoding the acquired first data to provide decoded amplitude modulation information; and
    generating a current vibration signal for vibrating the vibration apparatus using the decoded amplitude modulation information and an amplitude of a previously generated vibration signal, the decoded amplitude modulation information indicating a change from the amplitude of the previously generated vibration signal.

2. The non-transitory computer-readable storage medium having stored therein the vibration signal generation program according to claim 1, wherein
    the vibration signal is generated using waveform data indicating a predetermined waveform in which a value greater than a reference value and a value smaller than the reference value are repeated, and the decoded amplitude modulation information.

3. The non-transitory computer-readable storage medium having stored therein the vibration signal generation program according to claim 2, wherein
    in the predetermined waveform, positive and negative values are repeated.

4. The non-transitory computer-readable storage medium having stored therein the vibration signal generation program according to claim 3, wherein
    in the predetermined waveform, an amplitude is constant.

5. The non-transitory computer-readable storage medium having stored therein the vibration signal generation program according to claim 4, wherein
    the predetermined waveform is a sine wave in which an amplitude is constant.

6. The non-transitory computer-readable storage medium having stored therein the vibration signal generation program according to claim 4, wherein
    the predetermined waveform is a rectangular wave in which an amplitude is constant.

7. The non-transitory computer-readable storage medium having stored therein the vibration signal generation program according to claim 2, wherein the predetermined waveform is a waveform having a frequency at or near a resonance frequency of the vibration apparatus.

8. The non-transitory computer-readable storage medium having stored therein the vibration signal generation program according to claim 1, wherein
    data obtained by encoding amplitude modulation information with respect to each of different frequency ranges is acquired as the first data,
    the first data acquired with respect to each frequency range is decoded, and
    the vibration signal is generated using the amplitude modulation information decoded with respect to each frequency range.

9. The non-transitory computer-readable storage medium having stored therein the vibration signal generation program according to claim 8, wherein
    a first vibration waveform is generated using waveform data indicating a waveform of a first frequency and amplitude modulation information decoded for a first frequency range, a second vibration waveform is generated using waveform data indicating a waveform of a second frequency and amplitude modulation information decoded for a second frequency range, and the first vibration waveform and the second vibration waveform are combined together, thereby generating the vibration signal.

10. The non-transitory computer-readable storage medium having stored therein the vibration signal generation program according to claim 8, wherein
    data obtained by encoding amplitude modulation information with respect to each frequency range including at least one of frequencies to which a plurality of different human sensory receptors for receiving cutaneous sensation respond is acquired as the first data.

11. The non-transitory computer-readable storage medium having stored therein the vibration signal generation program according to claim 1, wherein
    second data obtained by encoding frequency modulation information indicating a change in a frequency is further acquired,
    the acquired second data is further decoded, and
    the vibration signal is generated using the decoded amplitude modulation information and frequency modulation information.

12. The non-transitory computer-readable storage medium having stored therein the vibration signal generation program according to claim 11, wherein a frequency of waveform data indicating a predetermined waveform in which a value greater than a reference value and a value smaller than the reference value are repeated is changed using the frequency modulation information, and an amplitude of the predetermined waveform is changed using the amplitude modulation information, thereby generating the vibration signal.

13. The non-transitory computer-readable storage medium having stored therein the vibration signal generation program according to claim 12, wherein the predetermined waveform is a waveform having a frequency at or near a resonance frequency of the vibration apparatus.

14. The non-transitory computer-readable storage medium having stored therein the vibration signal generation program according to claim 1, the vibration signal generation program further causing the computer to execute
vibrating the vibration apparatus by applying to the vibration apparatus the vibration signal generated in the generation of the vibration signal.

15. The non-transitory computer-readable storage medium having stored therein the vibration signal generation program according to claim 1, wherein
data obtained by encoding the amplitude modulation information is acquired from another apparatus through wireless communication.

16. The method of claim 1 wherein generating the current vibration signal using the decoded amplitude modulation information and the amplitude of a previously generated vibration signal comprises changing an amplitude level of the previously generated vibration signal by an amount of the change the decoded amplitude modulation information indicates and using the changed amplitude level to control the amplitude of the current vibration signal.

17. A vibration signal generation system, including at least a first apparatus and a second apparatus, for generating a vibration signal for vibrating a vibration apparatus,
the first apparatus comprising:
a storage device configured to store first data obtained by encoding amplitude modulation information indicating a changing amplitude in a vibration waveform for vibrating the vibration apparatus; and
a computer processor configured to transmit the first data to the second apparatus,
the second apparatus comprising a computer processor configured to:
receive the first data transmitted from the first apparatus;
decode the received first data to provide decoded amplitude modulation information; and
generate a current vibration signal for vibrating the vibration apparatus using the decoded amplitude modulation information and an amplitude of a previously generated vibration signal, the decoded amplitude modulation information indicating a change from the amplitude of the previously generated vibration signal.

18. A vibration signal generation apparatus for generating a vibration signal for vibrating a vibration apparatus, the vibration signal generation apparatus comprising a computer processor configured to perform operations comprising:
acquire data obtained by encoding amplitude modulation information indicating a changing amplitude;
decode the acquired data to provide decoded amplitude modulation information; and
generate a current vibration signal for vibrating the vibration apparatus using the decoded amplitude modulation information and an amplitude of a previously generated vibration signal, the decoded amplitude modulation information indicating a change from the amplitude of the previously generated vibration signal.

19. A vibration signal generation method to be executed by a processor or cooperation of a plurality of processors, the processor or the plurality of processors included in a system including at least one apparatus for generating a vibration signal for vibrating a vibration apparatus, the vibration signal generation method comprising:
acquiring data obtained by encoding amplitude modulation information indicating a changing amplitude;
decoding the acquired data to provide decoded amplitude modulation information; and
generating a current vibration signal for vibrating the vibration apparatus using the decoded amplitude modulation information and an amplitude of a previously generated vibration signal, the decoded amplitude modulation information indicating a change from the amplitude of the previously generated vibration signal.

20. A non-transitory computer-readable storage medium having stored therein a vibration signal generation program to be executed by a computer included in an apparatus for generating a vibration signal for vibrating a vibration apparatus, the vibration signal generation program causing the computer to execute operations comprising:
acquiring data obtained by encoding frequency modulation information indicating a change in a frequency;
decoding the acquired data to provide decoded frequency modulation information; and
generating a current vibration signal for vibrating the vibration apparatus using the decoded frequency modulation information and a frequency of a previously generated vibration signal, the decoded amplitude modulation information indicating a change from the amplitude of the previously generated vibration signal.

* * * * *